US006822550B1

(12) United States Patent
Sims et al.

(10) Patent No.: US 6,822,550 B1
(45) Date of Patent: Nov. 23, 2004

(54) INTELLIGENT ROLLED COIN DISPENSER

(75) Inventors: John W. Sims, Indianapolis, IN (US); Rex A. Townsend, Indianapolis, IN (US)

(73) Assignee: AT Systems, Inc., Pasadena, CA (US)

( * ) Notice: Subject to any disclaimer, the term of this patent is extended or adjusted under 35 U.S.C. 154(b) by 0 days.

(21) Appl. No.: 09/228,719

(22) Filed: Jan. 12, 1999

Related U.S. Application Data

(60) Provisional application No. 60/071,254, filed on Jan. 12, 1998.

(51) Int. Cl.[7] ................................................. H04Q 1/00
(52) U.S. Cl. ............................. 340/5.1; 705/16; 705/21; 705/25
(58) Field of Search .................. 700/237, 231–239; 340/3.2; 705/16, 25, 71

(56) References Cited

U.S. PATENT DOCUMENTS

| | | |
|---|---|---|
| 3,826,344 A | 7/1974 | Wahlberg |
| 4,070,564 A | 1/1978 | Tucker |
| 4,150,740 A | 4/1979 | Douno |
| 4,310,885 A | 1/1982 | Azcua et al. |
| 4,312,277 A | 1/1982 | Graef et al. |
| 4,554,444 A | 11/1985 | Hirose |
| 4,611,286 A | 9/1986 | Nishimura et al. |
| 4,808,801 A | 2/1989 | Nakagawa |
| 4,940,162 A * | 7/1990 | Thie ........................... 221/129 |
| 4,953,086 A | 8/1990 | Fukatsu |
| 5,013,896 A | 5/1991 | Ono et al. |
| 5,091,713 A * | 2/1992 | Horne et al. ................. 340/5.4 |
| 5,113,990 A | 5/1992 | Gabrius et al. |
| 5,173,590 A | 12/1992 | Nakano et al. |
| 5,351,303 A * | 9/1994 | Willmore ................... 340/5.53 |
| 5,366,404 A | 11/1994 | Jones |
| 5,561,281 A | 10/1996 | Eda et al. |
| 5,695,038 A | 12/1997 | Keith, III et al. |
| 5,725,081 A | 3/1998 | Meeker |
| 5,764,729 A * | 6/1998 | Black et al. .................. 379/44 |
| 5,813,510 A | 9/1998 | Rademacher |
| 5,883,371 A | 3/1999 | Meeker |
| 5,901,067 A | 5/1999 | Kao et al. .................... 364/492 |

(List continued on next page.)

FOREIGN PATENT DOCUMENTS

| | | |
|---|---|---|
| AU | 161431 | 10/1954 |
| GB | 2 217 073 A | 10/1989 |
| JP | 62-6391 | 1/1987 |

OTHER PUBLICATIONS

Allied Gary, Auto Bank, 2 Pages, 1990.
Why The McGunn Smart Safe 2000®?, McGunn Safe Company, 5 pages.

(List continued on next page.)

*Primary Examiner*—Brian Zimmerman
(74) *Attorney, Agent, or Firm*—Christie, Parker & Hale, LLP

(57) ABSTRACT

A money dispensing apparatus includes a controller, an electronic communication network and at least one dispensing unit. The money dispensing apparatus may also include a keyboard, a display, and an uninterruptible power supply. Each dispensing unit may include at least one sensor and a dedicated communication module. The communication module may include a control board and be configured to receive dispense commands and send dispense status commands over the electronic communication network, which is further capable of communication with various peripheral and external devices. The electronic communication network may use various communication protocols to communicate with the dispensing units and the peripherals. The communication module of the individual dispensing unit may communicate using various and multiple communication protocols and is capable of receiving dispense commands and sending dispense status information over the electronic communication network.

37 Claims, 29 Drawing Sheets

U.S. PATENT DOCUMENTS

| | | | |
|---|---|---|---|
| 5,918,720 A | 7/1999 | Robinson | |
| 5,926,796 A | 7/1999 | Walker et al. | 705/16 |
| 5,944,163 A | 8/1999 | Keith, III et al. | |
| 5,953,709 A | 9/1999 | Gilbert et al. | 705/35 |
| 5,975,275 A | 11/1999 | Keith, III et al. | |
| 5,982,918 A * | 11/1999 | Mennie et al. | 705/43 |
| 5,987,426 A | 11/1999 | Goodwin, III | 705/21 |
| 6,040,770 A * | 3/2000 | Britton | 340/539 |
| 6,092,629 A * | 7/2000 | Bohnert et al. | 186/53 |

OTHER PUBLICATIONS

Tidel Engineering, Inc., "Still Taking Chances with Your Cash Management," TACC Cash Deposit and Dispensing Safe, 1993, 4 pages.

Tidel Engineering, Inc., "This Doesn't Seem Like Much Now!," TACC Cash Deposit and Dispensing Safe, 1993, 4 Pages.

Computerized To Provide Perfect Security and Save Thousands of Dollars in Operation Cost!, McGunn Safe Company, Oct. 1994, 4 Pages.

Cash Management: The Needs are the Same Only the Methods Change, 2 Pages.

Cash Control Safes Built For Use in the Convenience Store, Petroleum and Restaurant Industries, McGunn Security Portfolio, 6 pages, Oct. 1994.

Sensible Money Management "Got Any Money"?, 4 pages, Sep. 1994.

Cash Management Systems Have Just Taken a Giant Leap Forward, Revenue Management System RMS–1XL, Autovend, 4 pages, Feb. 1991.

RMs–1 Smart Safe, Revenue Management System, 4 pages, Sep. 1989.

Roadblock Against Temptation, Autovend, 2 pages.

Your Custom Requirements, Design our Standard Project, Armor Safe Technologies, 10 pages, 1994.

* cited by examiner

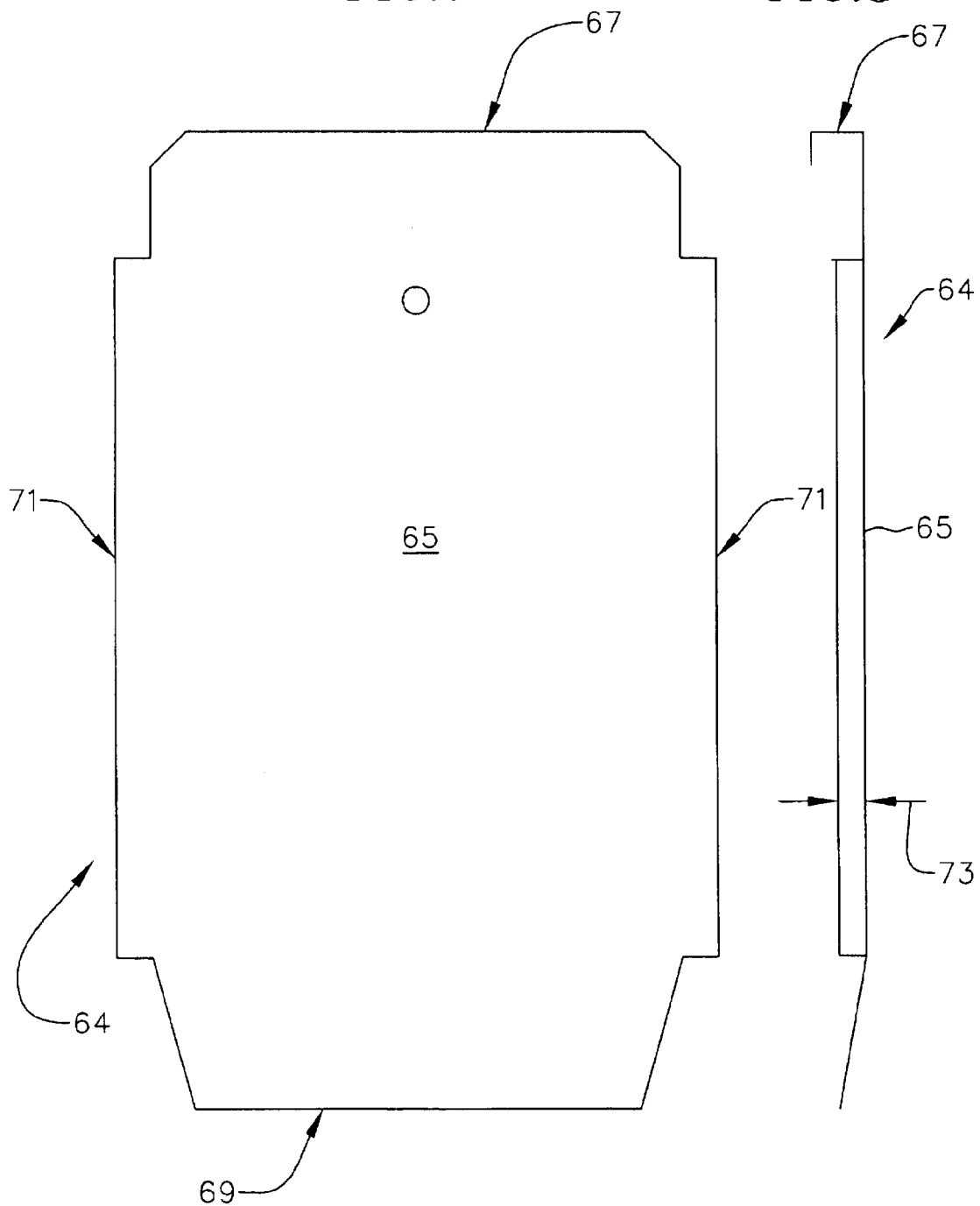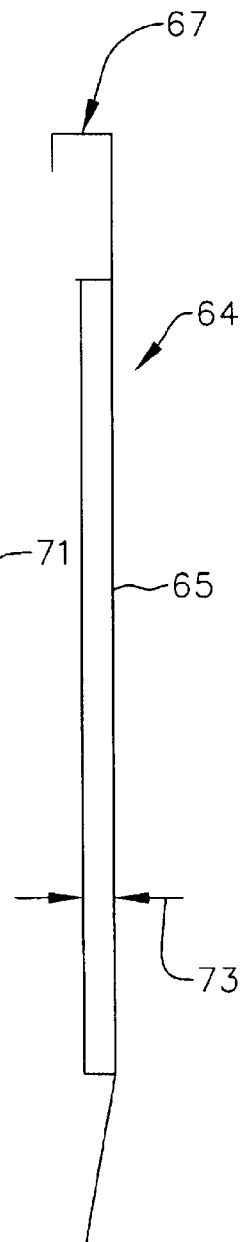

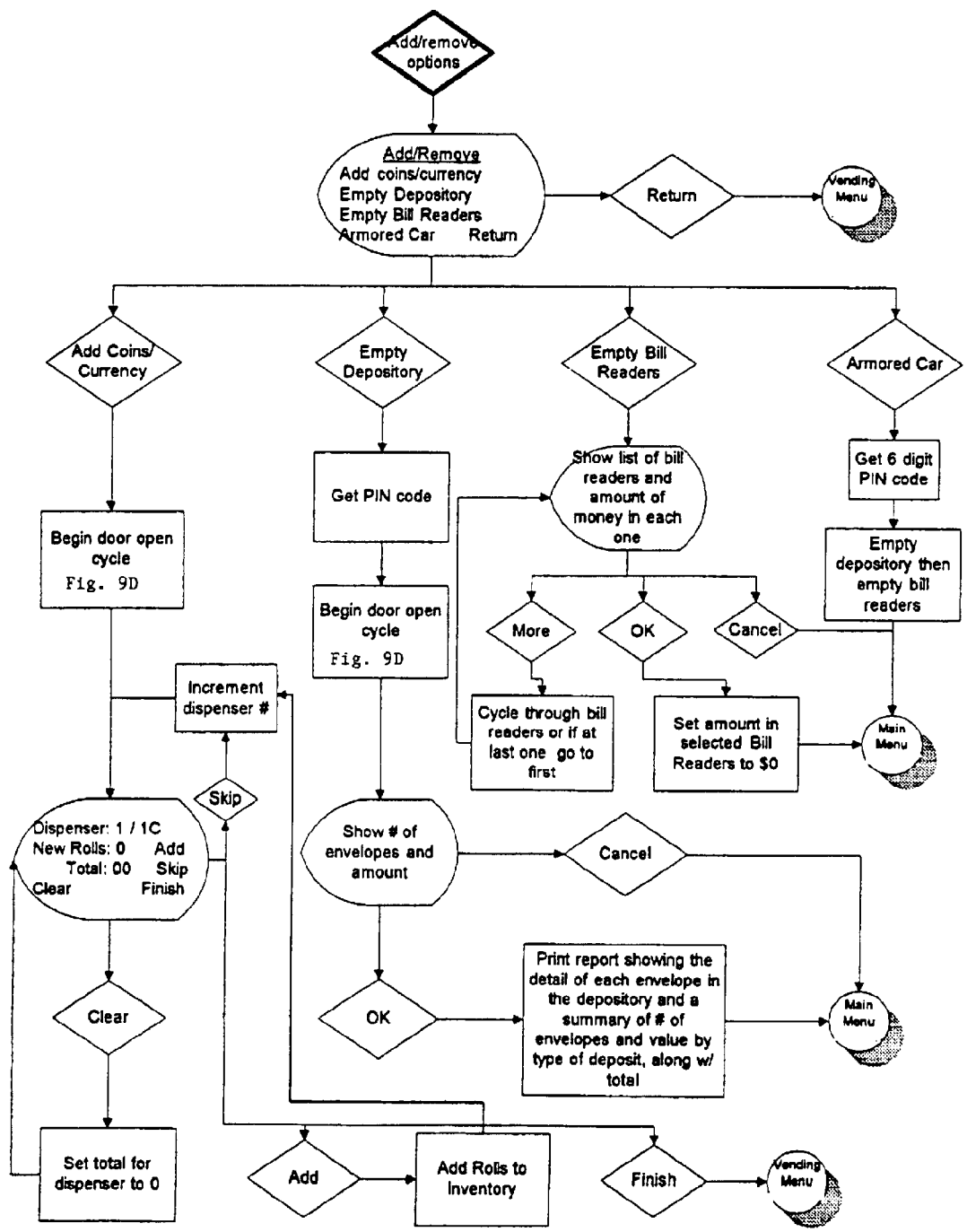
FIG. 9F  Add/Remove Options

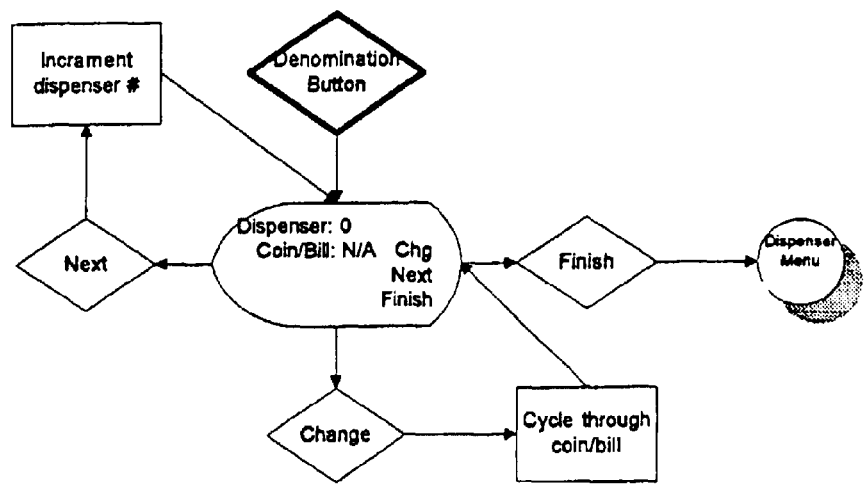
FIG. 9L Denomination (Dispensers)
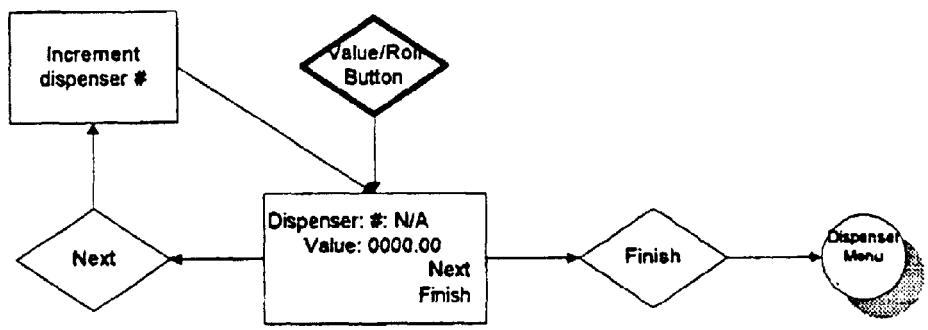
FIG. 9M Value/Roll (Dispensers)
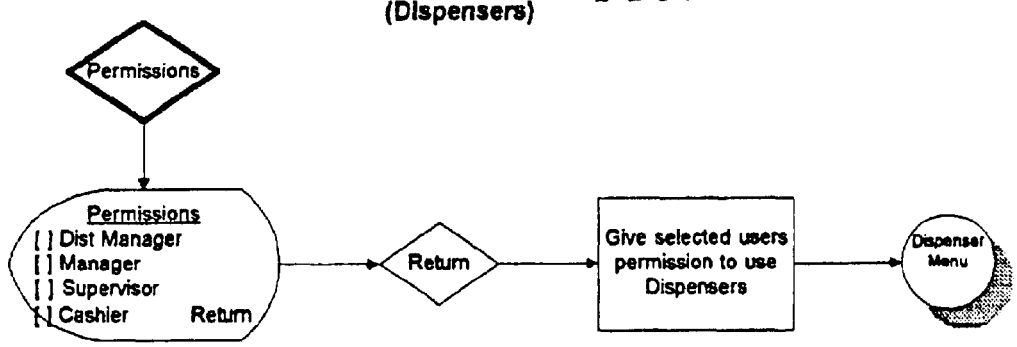
FIG. 9N Permissions (Dispensers)

Drawer (Dispensers)      *FIG. 9S*
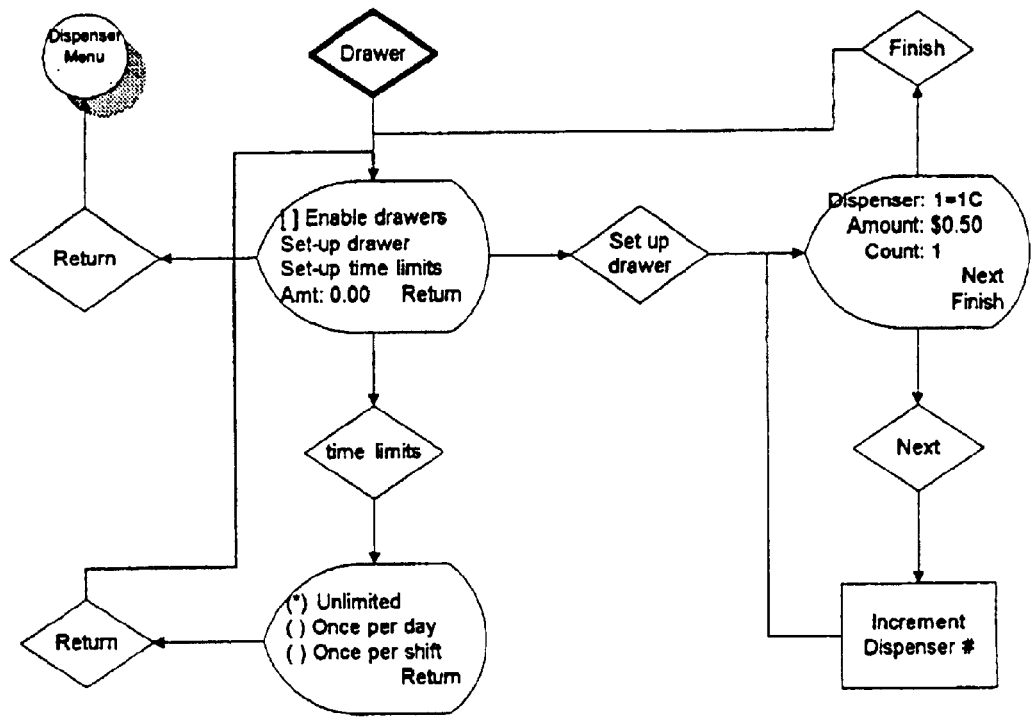
Lockout
(Dispensers)      *FIG. 9T*
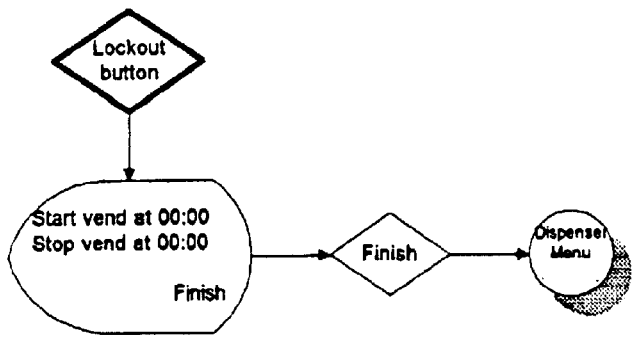

US 6,822,550 B1

INTELLIGENT ROLLED COIN DISPENSER

RELATED APPLICATIONS

This application claims priority of U.S. Provisional Application Serial No. 60/071,254, entitled INTELLIGENT ROLLED COIN DISPENSER, filed on Jan. 12, 1998.

BACKGROUND AND SUMMARY OF THE INVENTION

The present invention relates to dispensing machines, and particularly to machines for dispensing coins that are rolled or wrapped. More particularly, the present invention relates to rolled coin dispensing machines having an electronic control system for interfacing the coin dispenser with operators and other devices.

Rolled coin dispensers typically provide a mechanism for storing rolled coins of varying denominations, such as pennies, nickels, dimes, and quarters, and an interface for providing the rolled coins to a user, for example in exchange for paper money or upon entry of a suitable access code. Such dispensers are often used by businesses such as convenience stores where customer requirements dictate the need for a variable and potentially large supply of coins. Rolled coin dispensers can also dispense paper money that is rolled into tubes.

According to one aspect of the present invention, an apparatus for dispensing rolled coins includes an electronic communication network. At least one rolled coin dispenser unit is coupled to the network and configured to receive commands and to send information over the network. A controller is also coupled to the network and configured to send commands to and to receive information from the at least one rolled coin dispenser over the network.

In preferred embodiments, the communication network is a master-slave communication network. The controller is the "master" communication device. The one or more rolled coin dispenser units are "slave" communication devices, although other configurations include using a peer-to-peer or other types of communication networks. A computer such as a conventional personal computer can be coupled to either the controller or the communication network. The personal computer can be coupled to the controller or the communication network by a serial communication link.

In preferred embodiments, a display and a user input device are coupled to either the controller or the communication network. Examples of user input devices are a keypad and a touch screen, similar to input devices used for automatic teller machines. Other devices such as a card reader, a bill reader, a bill dispenser, and a printer can also be coupled to either the controller or the communication network.

In preferred embodiments, a modem is coupled to either the controller or the communication network to send commands and to receive information from remote locations. A security alarm, which can include sensors such as a motion detector and/or a heat detector, is coupled to one of the controller or the communication network.

In preferred embodiments, the rolled coin dispenser includes a sensor, such as a photo-electric sensor, that provides a signal that indicates a roll of coins has been dispensed. The dispenser then sends information that indicates this dispensing over the communication network. The dispenser can evaluate the photo-electric sensor signal to determine if any empty container has been dispensed. The sensor can be a pair of sensors to provide advantages associated with redundancy.

In preferred embodiments, the apparatus for dispensing rolled coins includes a retina scanning device and/or a fingerprint scanning device coupled to either the controller or the communication network. A communication device, also coupled to the controller or the communication network, can be provided to send and to receive information over a cellular telephone network. A security alarm and software can be provided to transmit security alarm status information over the cellular telephone network.

According to another aspect of the present invention, a rolled coin dispenser apparatus is provided for use with a controller coupled to an electronic communication network. The dispenser includes a rolled coin reservoir configured to hold rolled coins for dispensing and has a dispensing opening. A dispensing mechanism is coupled to the reservoir adjacent the opening. The dispensing mechanism has a communication module configured to receive a dispense command and to send dispense status information over the electronic communication network.

According to yet another aspect of the present invention, an apparatus for dispensing rolled coins includes two dispensing units to dispense two denominations of rolled coins. A controller is coupled to the two dispensing units to control dispensing of rolled coins. The controller includes user interface software to permit a user to select combinations of denominations of rolled coins for dispensation based on a predetermined transaction value. The transaction value can be, for example, an amount authorized via data entry, an amount based on paper money fed into the apparatus via a bill verifier unit, information obtained from a card inserted into a card reader, debit or credit information obtained from a financial institution or from a credit card, etc.

According to still yet another aspect of the present invention, an apparatus for dispensing money includes a first dispensing unit to dispense paper money and a second dispensing unit to dispense rolled coins. A controller is coupled to the two dispensing units and configured to control dispensing of both the bills and the coins. The controller includes user interface software to permit a user to select combinations of denominations for dispensation based on a predetermined transaction value as discussed above. Thus, a user can be provide with rolled coins and/or paper money.

According to another aspect of the present invention, an improvement for use in a rolled coin dispensing apparatus is provided. The dispensing apparatus includes a reservoir for holding rolled coins to be dispensed through an opening. A dispensing mechanism is provided adjacent the opening. The improvement includes providing a low-friction reservoir surface coating to reduce friction between the reservoir and the rolled coins. The low-friction reservoir surface coating can be a Teflon coating. A reservoir insert configured for insertion into a portion of the reservoir can provide the low-friction reservoir surface coating.

According to still another aspect of the present invention, an apparatus for dispensing money is provided. The money dispenser includes a cash dispensing unit, an uninterruptible power supply, a cellular network telemetry device, a sensor configured to detect an alarm condition, and a controller. The controller is coupled to the cash dispensing unit, uninterruptible power supply, and cellular network telemetry device. The devices can be coupled by any means, including direct connections or use of any type of communicating network. The controller is configured to send a message over the cellular network telemetry device automatically when the sensor detects an alarm condition.

Additional features of the invention will become apparent to those skilled in the art upon consideration of the following detailed description of the preferred embodiment exemplifying the best mode of carrying out the invention as presently perceived.

BRIEF DESCRIPTION OF THE DRAWINGS

FIG. 7 is a front view of a reservoir insert;

FIG. 8 is a side view of the insert of FIG. 7;

DETAILED DESCRIPTION OF DRAWINGS

Figure 1:
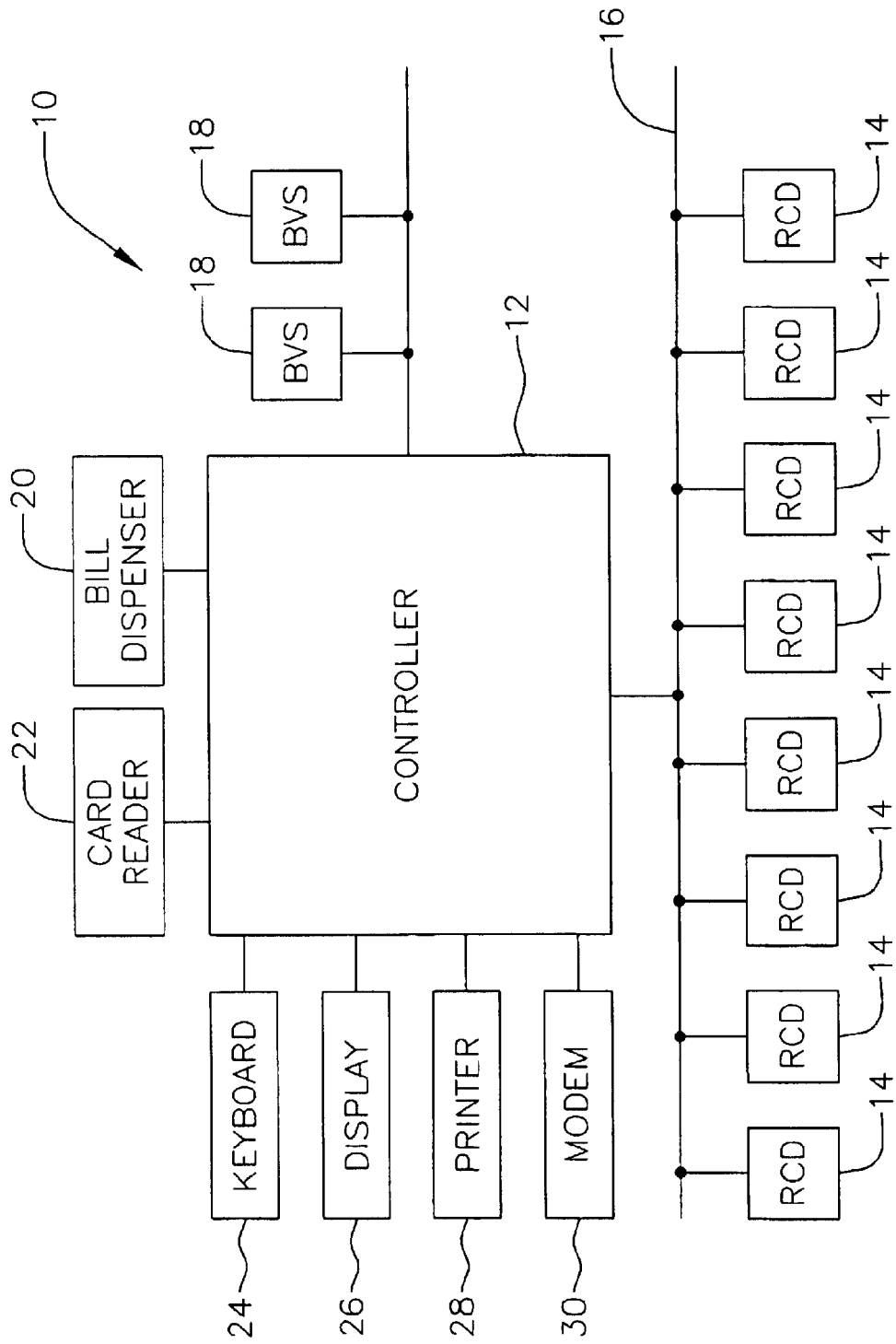
FIG. 1 is a logical block diagram of a rolled coin dispenser apparatus of the present invention including a controller coupled by a communication network to several rolled coin dispenser units and to several peripheral devices including bill verifiers and stackers, a bill dispenser, a card reader, a keyboard, a display, a printer, and a modem.

A rolled coin dispenser apparatus 10 according to the present invention includes a controller 12 and eight rolled coin dispenser (RCD) units 14 coupled to an electronic communication network 16 as best shown in FIG. 1. Communication network 16 illustratively an RS-485 serial bus over which controller 12 and dispensers 14 communicate using a serial communication protocol. It is understood that although the illustrative communication protocol is a master/slave protocol over a serial bus, any suitable communication mechanism can be used, such as a parallel bus, a peer-to-peer network, e.g., Ethernet or Echelon LONworks™, a token ring, etc.

Dispenser apparatus 10 further includes a variety of other devices as shown in FIG. 1, including two bill verifier and stacker (BVS) units 18, a bill dispenser 20, a card reader 22, a keypad 24, a display 26, a printer 28, and a modem 30. The BVS units 18 are illustratively model SA7 units manufactured by Mars Electronics International and are connected to the controller using a serial bus 32. Any type of bill validator can be used and any type connection can be used to couple controller 12 to BVS units 18.

Figure 2:
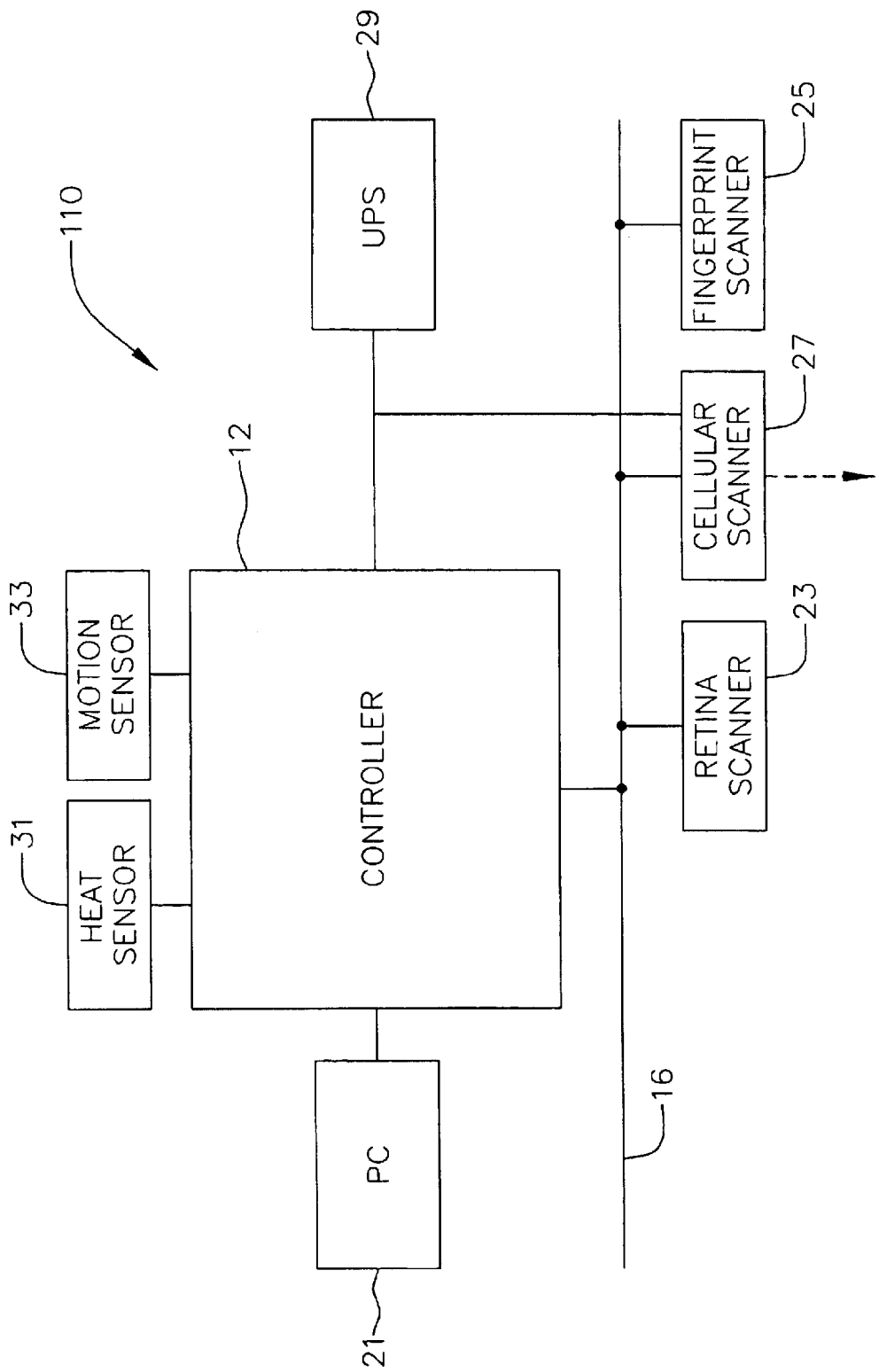
FIG. 2 is a logical block diagram showing an alternative embodiment in which the controller is coupled to a computer, a retina scanner, a fingerprint scanner, and a cellular telemetry device, heat and motion sensors are coupled to the controller, and an uninterruptible power supply is coupled to the controller and to the cellular telemetry device.

Card reader 22 is illustratively a model MT-215232 made by Magtek coupled directly to controller 12, although, again, any suitable card reader is contemplated. Similarly, bill dispenser 20, keypad 24, display 26, printer 28, and modem 30 can be any suitable device and are also illustratively coupled directly to controller 12. Keypad 24 and display 26 can optionally be replaced by a touch screen device as shown in FIG. 2. A computer such as a personal computer 21 also can be directly connected to controller 12, either using the modem port or by suitably configuring another I/O port. Any of these "peripheral devices" 18, 20, 22, 24, 26, 28, 30 can be coupled to controller 12 by a communication network such as network 16.

Thus, controller 12 has a flexible I/O configuration for communication with and control of other devices either through direct coupling or over a communication network. Controller 12 is also configured to be integrated with other devices such as a retina reading device 23, a fingerprint reading device 25, or a device 27 for providing telemetry uplink and downlink capability over a cellular telephone network as shown in FIG. 2. This architecture provides, inter alia, for enhancing security features. For example, as shown in FIG. 2, by including an uninterruptible power supply 29 and a cellular network telemetry device 27, dispenser apparatus 110 can send an alarm message based on an alarm sensor, such as a heat sensor 31 or motion sensor 33, to a remote site automatically, without any external power or communication lines. Other sensors can be provided and used, such as door open sensors, etc., and status information from the sensors as well as other information such as transaction monitoring information can be sent to remote sites.

Figure 3:
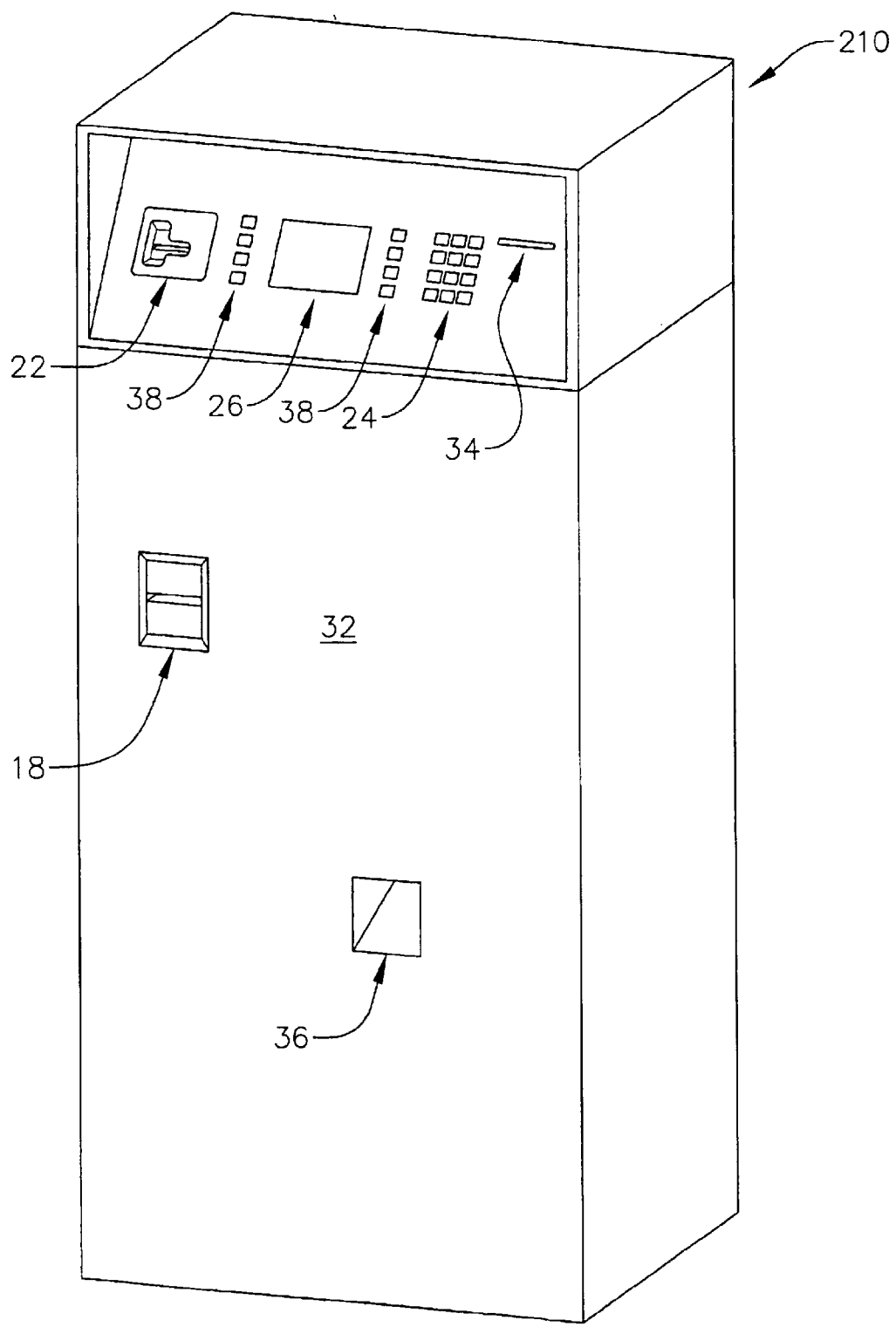
FIG. 3 is a front perspective view of a rolled coin dispenser apparatus embodiment according to the present invention.
Figure 4:
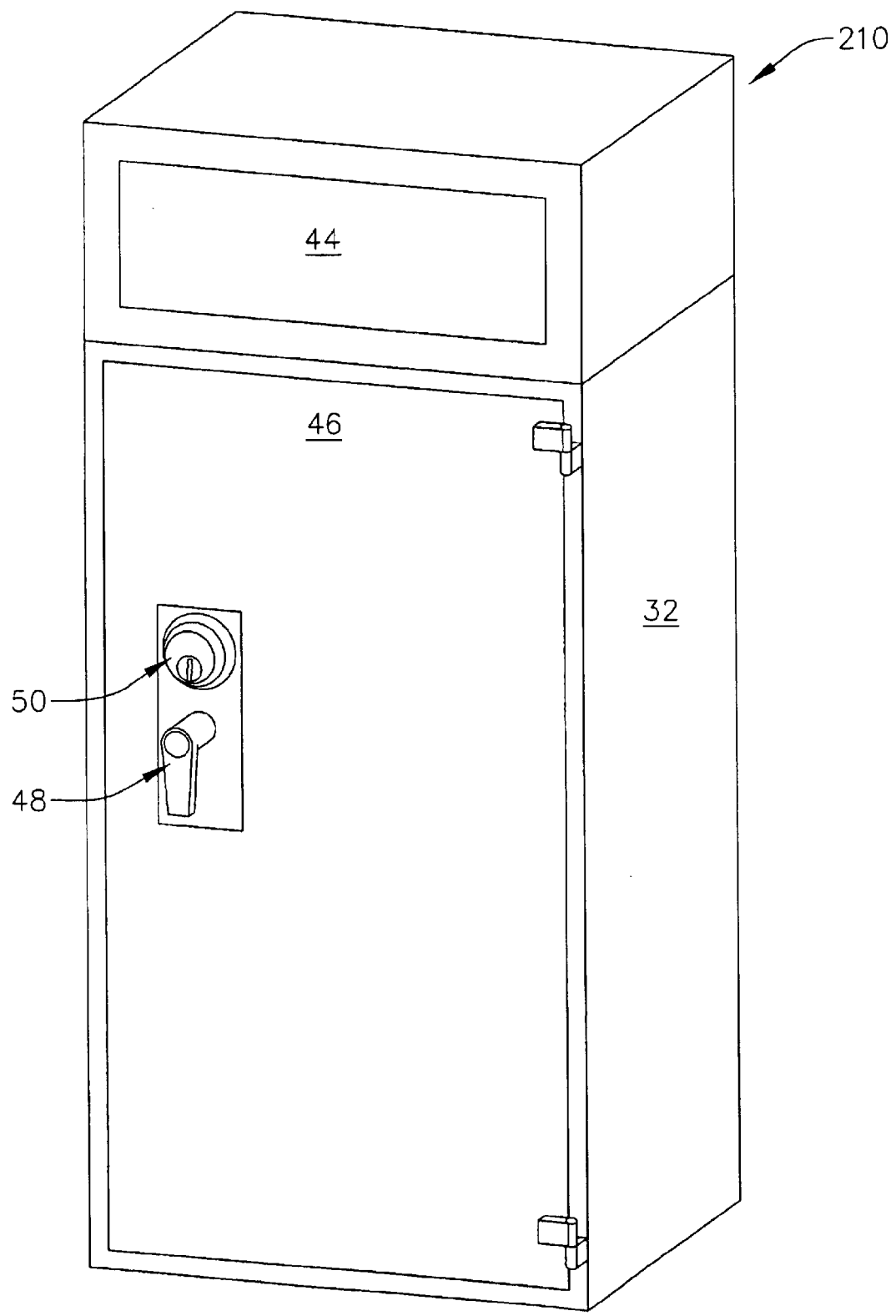
FIG. 4 is a rear perspective view of the embodiment of FIG. 3.

A rolled coin dispensing apparatus 210 of the present invention is shown in FIG. 3 looking toward the front of a rolled coin dispenser housing 32. A card reader 22, display 26, keypad 24, a slot 34 for providing printed receipts from a printer (not shown), BVS 18, and a coin chute opening 36 that receives a roll of coins from rolled coin dispensers 20 are provided. Display 26 is a liquid crystal display (LCD), and keypad 24 includes two columns of buttons 38, 40 arranged next to LCD 26 for user input of menu selections, and a numeric keypad 24. A touch screen can be used. FIG. 4 shows a hinged access panel 44 near the top of dispensing apparatus 210 and an access door 46 that includes a handle 48 and combination lock 50.

Figure 5:
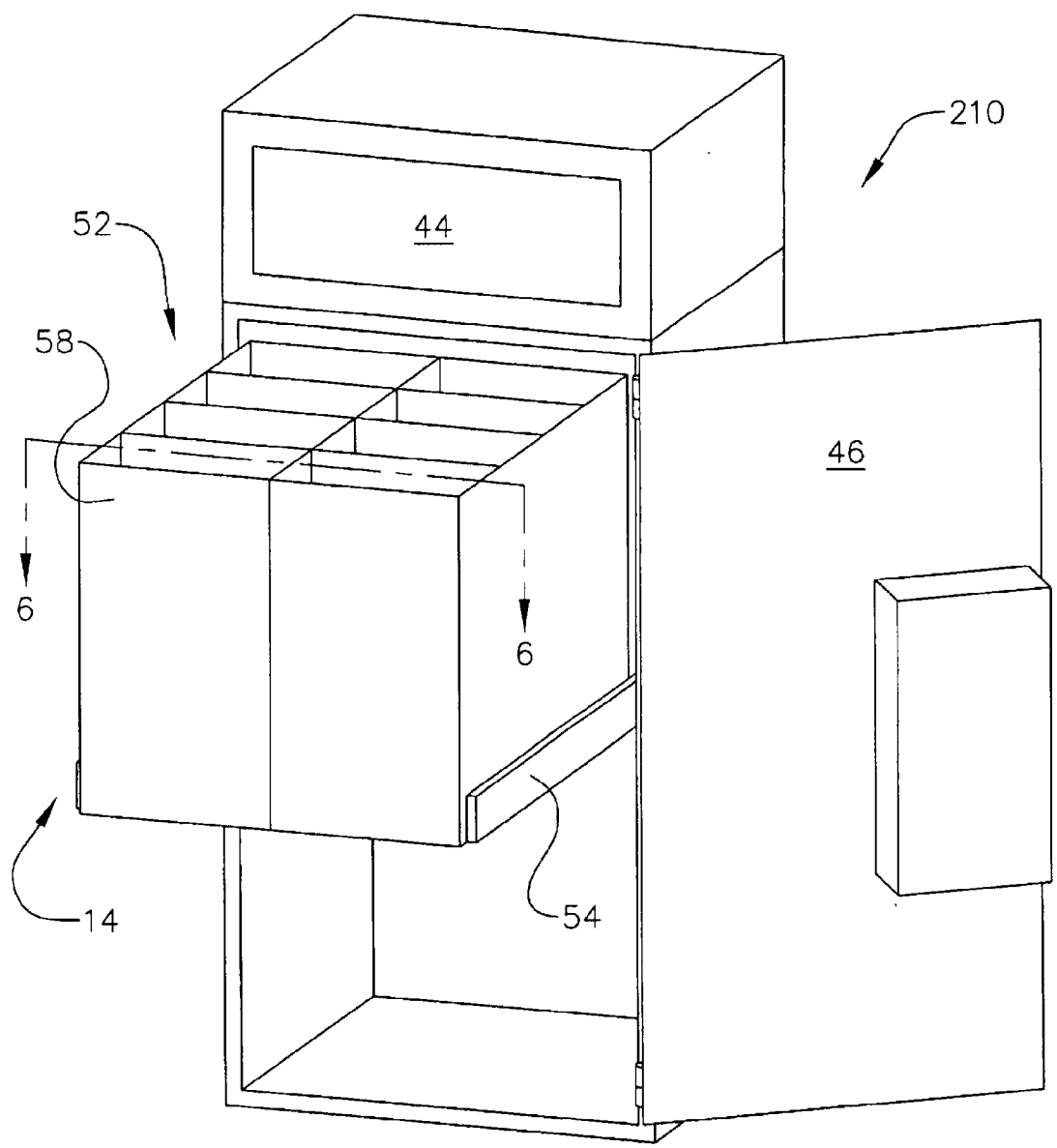
FIG. 5 is a view similar to FIG. 4 with a rear access door open to show eight rolled coin reservoirs.

Dispensing apparatus 210 includes eight rolled coin dispensers 14 each having a reservoir 52 as shown in FIG. 5. Dispensers 14 are coupled to housing 32 by a pair of slide arms 54. Five dispensers 14 are configured to hold rolls of quarters, with remaining three configured for rolls of dimes, nickels, and pennies, although this configuration can vary. Dispenser 14 can be configured to hold any denomination of coin, or a tube of rolled paper bills.

Figure 6:
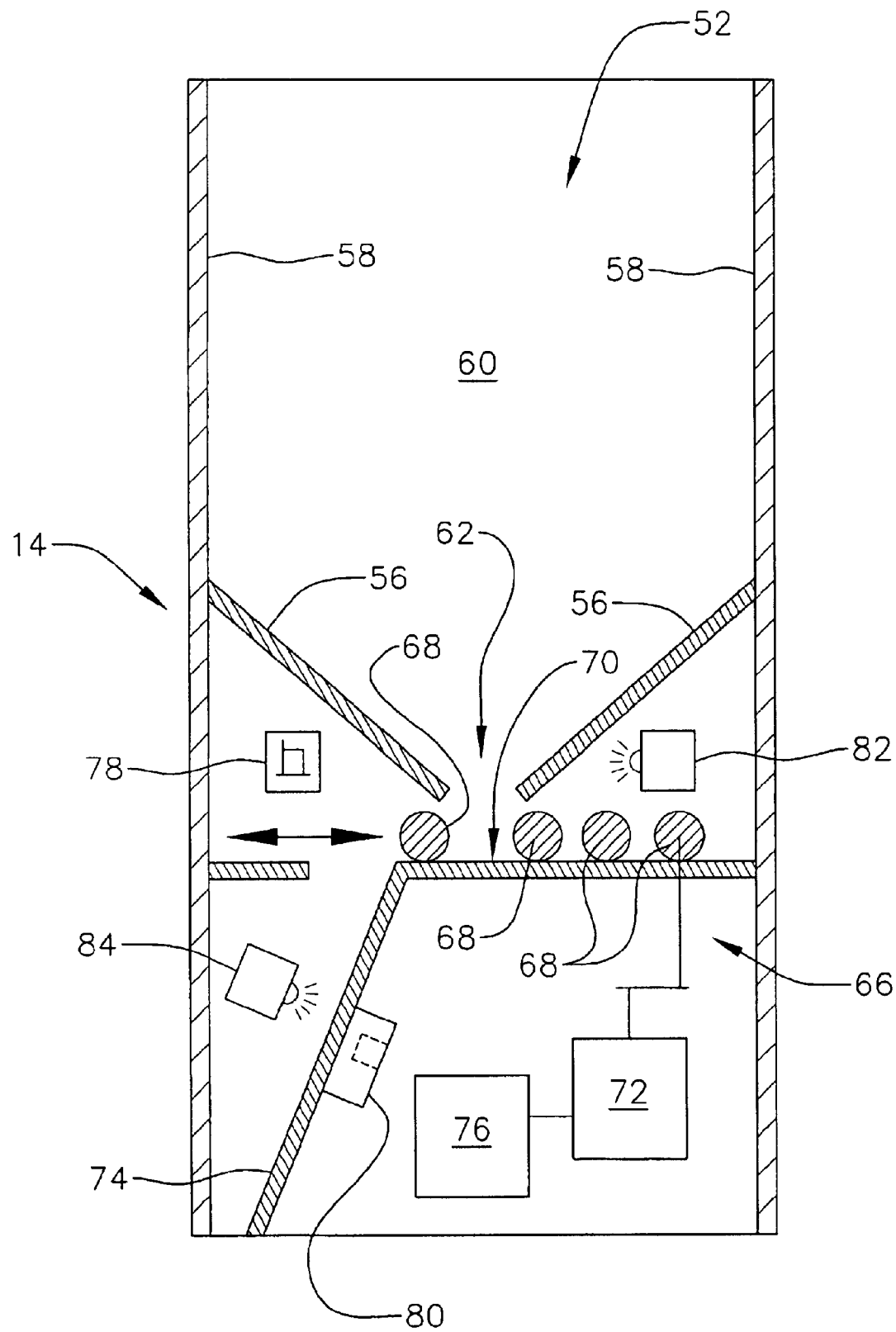
FIG. 6 is a sectional view taken along line 6—6 of FIG. 5 showing details of a rolled coin dispensing unit and reservoir.

Each rolled coin reservoir 52 is illustratively configured with sloped lower walls 56, vertical upper side walls 58, lateral side walls 60, and a dispensing opening 62 as best shown in the sectional view of FIG. 6. Lateral side walls 60 are spaced apart a distance greater than the length of a roll of coins. Note that although reservoirs 52 have a particular described geometry, a reservoir can be any structure that retains rolled coins.

Rolled coins are often provided in rolls made of material such as polyethelyne, which because of its relatively high coefficient of friction can resist movement along the inner surfaces of reservoir 52. In order to minimize the friction between rolled coins and reservoir 52, inside surfaces of the reservoir walls are provided with a low-friction surface. Illustratively, a commercial Teflon coating such as that available from Metal Technology of Indiana, Inc. located in Lebanon, Ind. is used. Other low-friction coatings can be used, or the inner surfaces of reservoir 52 can be treated by other means such as polishing to provide an appropriate surface.

In order to improve alignment of rolled coins stacked into the portion of reservoir 52 above sloped walls 56, a reservoir insert 64 as shown in FIGS. 7 and 8 is provided to reduce the lateral width between side walls 60. Illustratively, reservoir insert 64 is a metal plate that includes a low-friction face 65, a top portion 67, a bottom portion 69, and two side portions 71 as best shown in FIG. 7. Low-friction face is provided with a commercial Teflon coating as discussed above.

Side portions 71 are bent 90° so that low-friction face 65 will be offset from lateral side wall 60 by a distance 73, illustratively 0.437 inches. Bottom portion is bent to provide a ramp surface at the bottom of polished face 65 that extends inwardly by distance 73. Top portion 67 is configured to be coupled reservoir 56 by two 90° bends for attaching insert 64 over a top edge of reservoir lateral wall 60 to extend downwardly to a point above sloped walls 56. Reducing the lateral width of reservoir 52 above sloped walls 56 minimizes the tendency of rolled coins to jam or "bridge", thereby improving reliability of rolled coin dispenser 14.

Dispenser 14 further includes a reciprocating dispensing mechanism or ejector 66 coupled to reservoir 52 adjacent opening 62 to selectively dispense or eject a roll of coins to coin chute opening 36. Dispensing mechanism 66 includes a plurality of rollers 68, a pair of which define a pocket 70 configured to hold a roll of coins to be dispensed, and a motor 72 coupled to rollers 68. Motor 72 is configured to reciprocate rollers 68 so that pocket 70 moves between reservoir opening 62 and a coin dispensing chute 74. This dispensing mechanism is illustratively the same dispensing mechanism disclosed in U.S. Pa. No. 4,940,162 to Thie, entitled "Rolled Coin Dispenser", the entire disclosure of which is hereby incorporated by reference. It is understood, however, that configurations other than this illustrative dispensing mechanism are contemplated by this invention, for example mechanisms such as that shown in U.S. Pat. No. 4,860,922 to Malservisi et al., entitled "Automatic Dispenser for Cylindrical Commodities, In Particular Packets of Coin".

Figure 10:
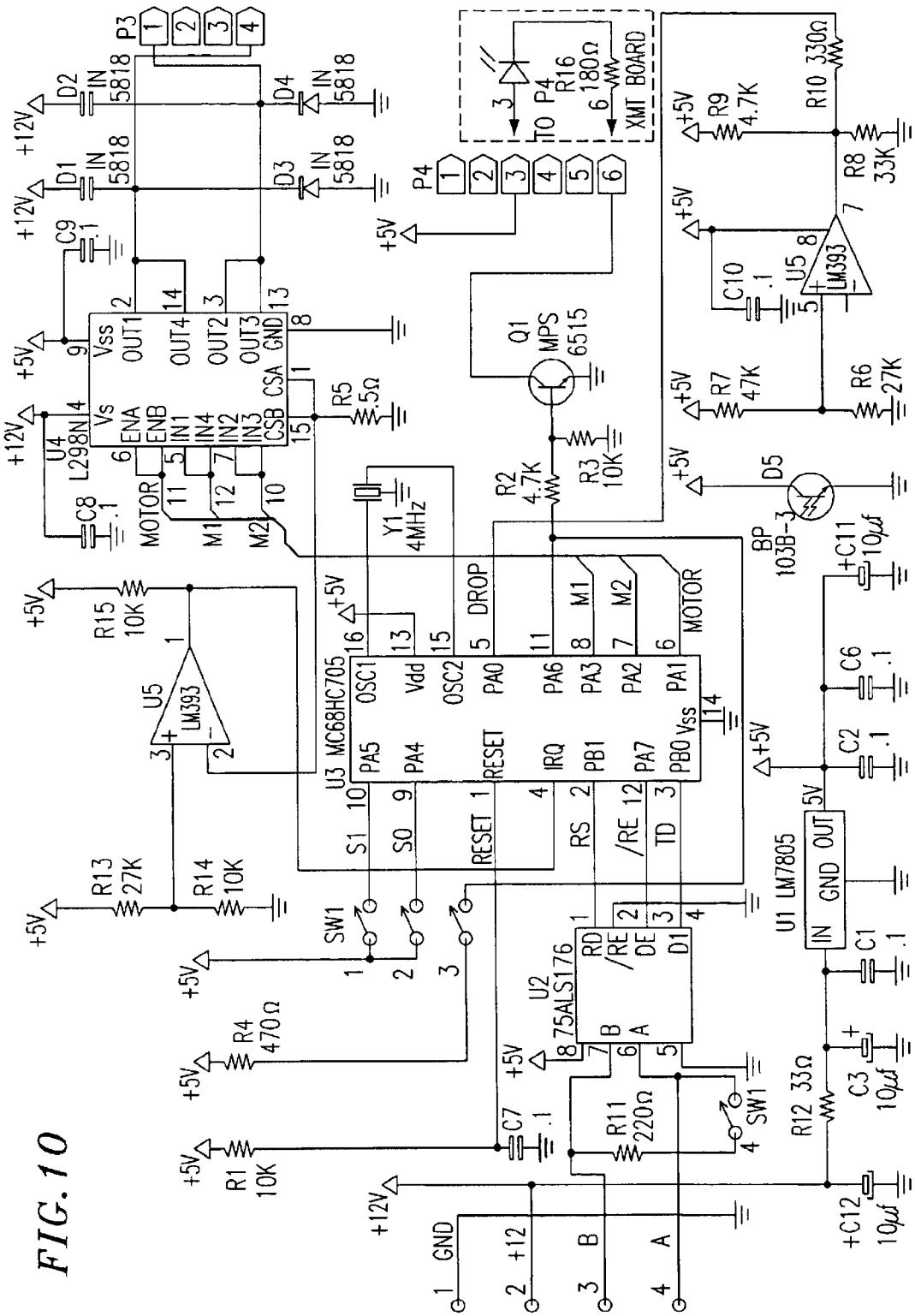
FIG. 10 is a schematic of an illustrative control board for a rolled coin dispenser unit according to the present invention.
Figure 11:
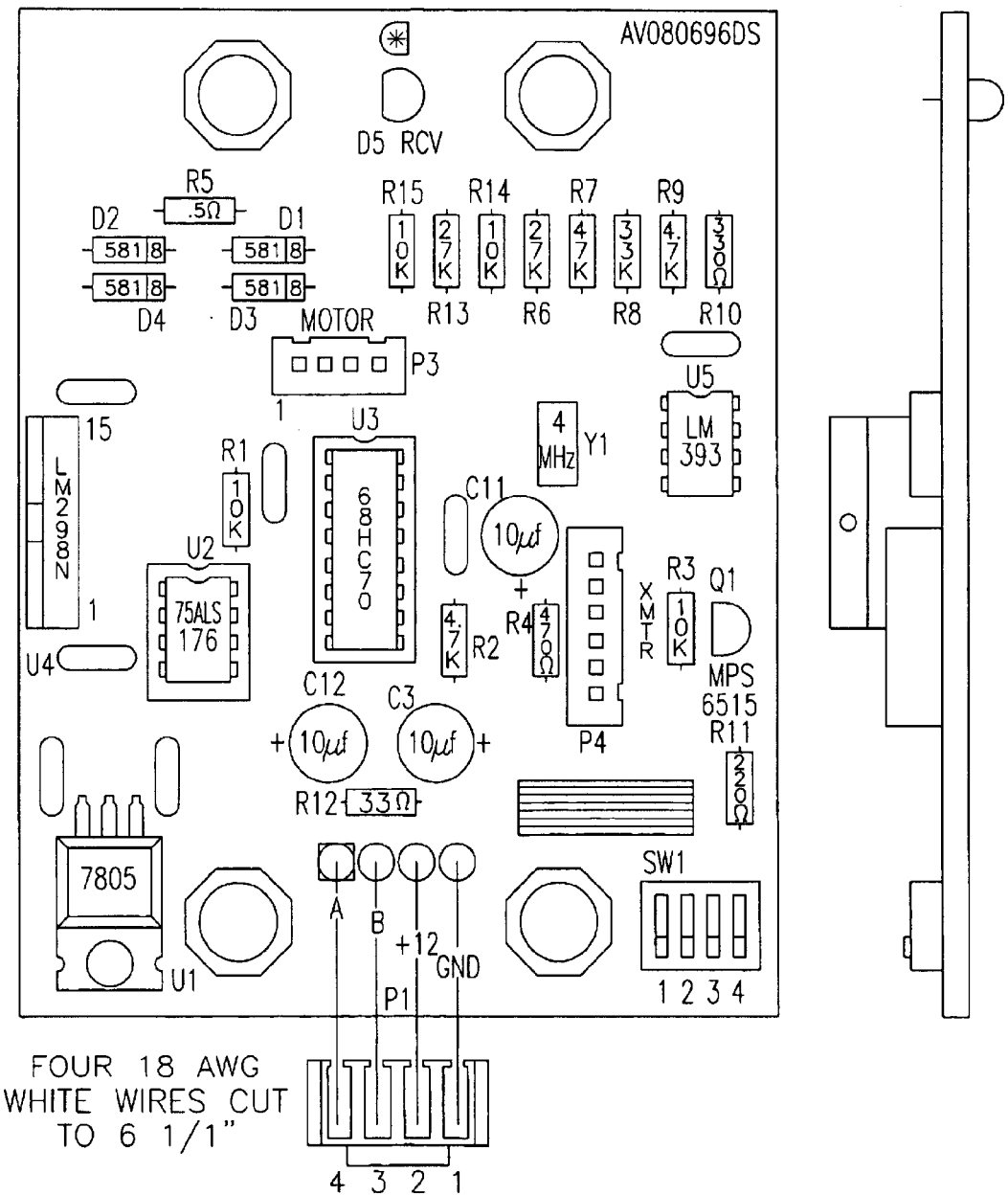
FIG. 11 is a board layout of the control board of FIG. 10.

Dispenser 14 further includes a control board 76 coupled to motor 72 and configured for communication over network 16 to receive commands to actuate motor 72 to dispense a roll of coins. A logical schematic diagram for an illustrative control board 76 and a corresponding board layout are shown in FIGS. 10–11. Dispenser 14 can also include a reservoir empty sensor 78 that detects if no rolled coins are present in reservoir 52 and a drop sensor 80 that detects if a roll of coins has dropped down chute 74. Sensors 78, 80 are illustratively photo-electric sensors optically coupled to light emitting diodes (LEDs) 82, 84 respectively, and are coupled to control board 76 so that sensor status information can be provided over communication network 16. To improve reliability of the sensor components LEDs 82, 84 can each comprise a pair of LEDs connected in parallel so that if one LED fails the sensor will continue to operate properly.

Drop sensor 80 provides a signal to control board 76, illustratively a resistance value based on light received from LED (or LEDs) 84, that dispenser 14 uses to determine if a roll or coins or a tube containing paper money has been dropped. By using a translucent tube, software in control board 76 can check the photo-electric return signal to determine accurately whether a roll of coins has dropped down chute 74, that is, it checks the resistance value to determine if an empty tube has been dropped. Further, drop sensor 80 is maintained in a continuously active state so that if rolled coin dispenser 14 inadvertently drops a roll of coins or paper money, for example after a power glitch, this event will be reported. Based on a known starting value of rolled coins within reservoir 56, this allows for monitoring dispensation of rolls of coins to provide an accurate method of tracking inventory in each reservoir.

Figure 15:
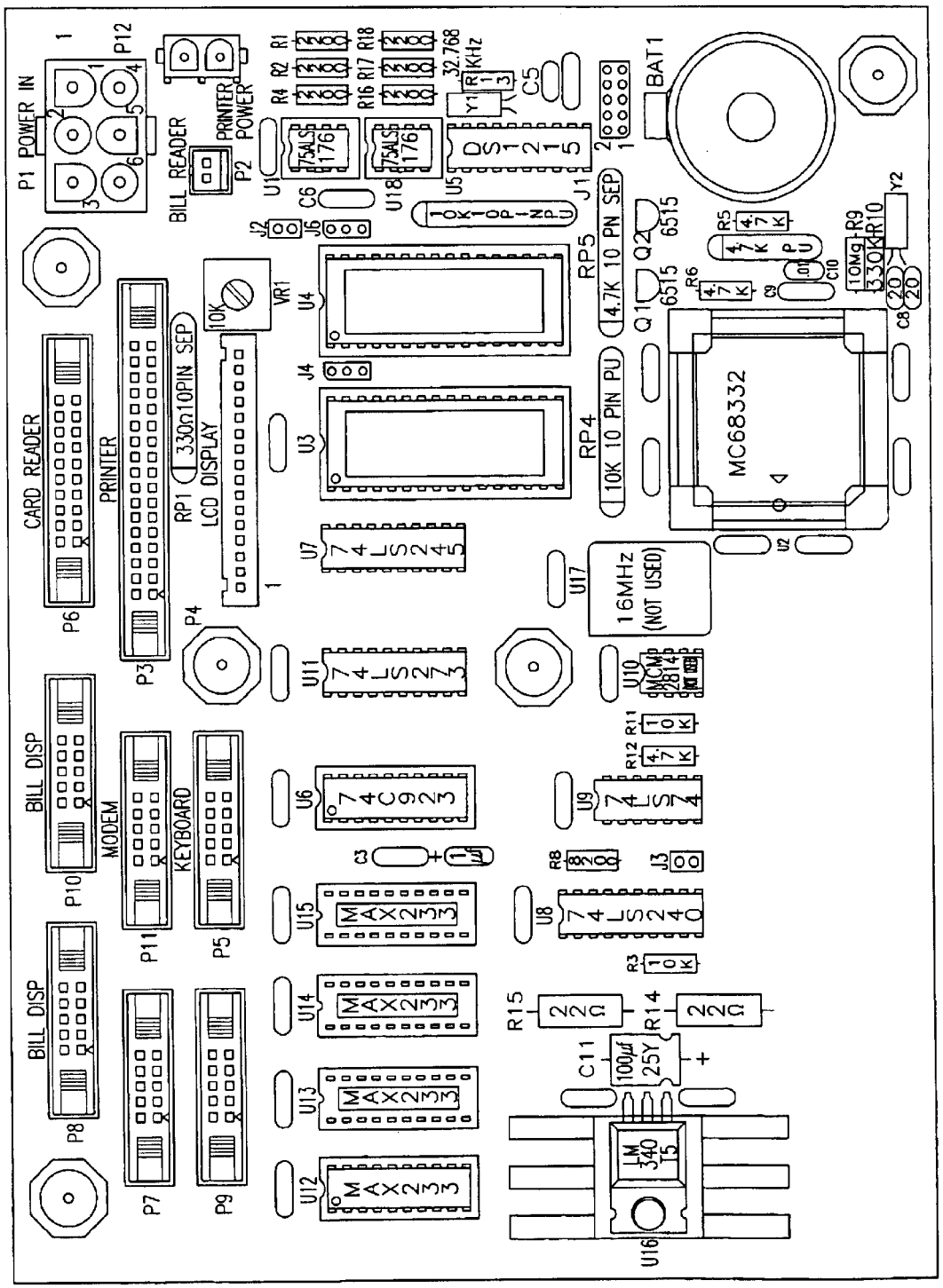
FIG. 15 is a board layout of the controller of FIGS. 14A–D.

Controller 12 illustratively includes a Motorola model MC68332 microcontroller. FIGS. 14–15 show a logical schematic and board layout for an illustrative implementation of controller 12. As discussed above, controller 12 includes interfaces for direct coupling with devices 20, 22, 24, 26, 28, 30 and communicates with rolled coin dispenser units 14 over a communication network 16, which illustratively is an RS-485 communication line.

Figure 12:
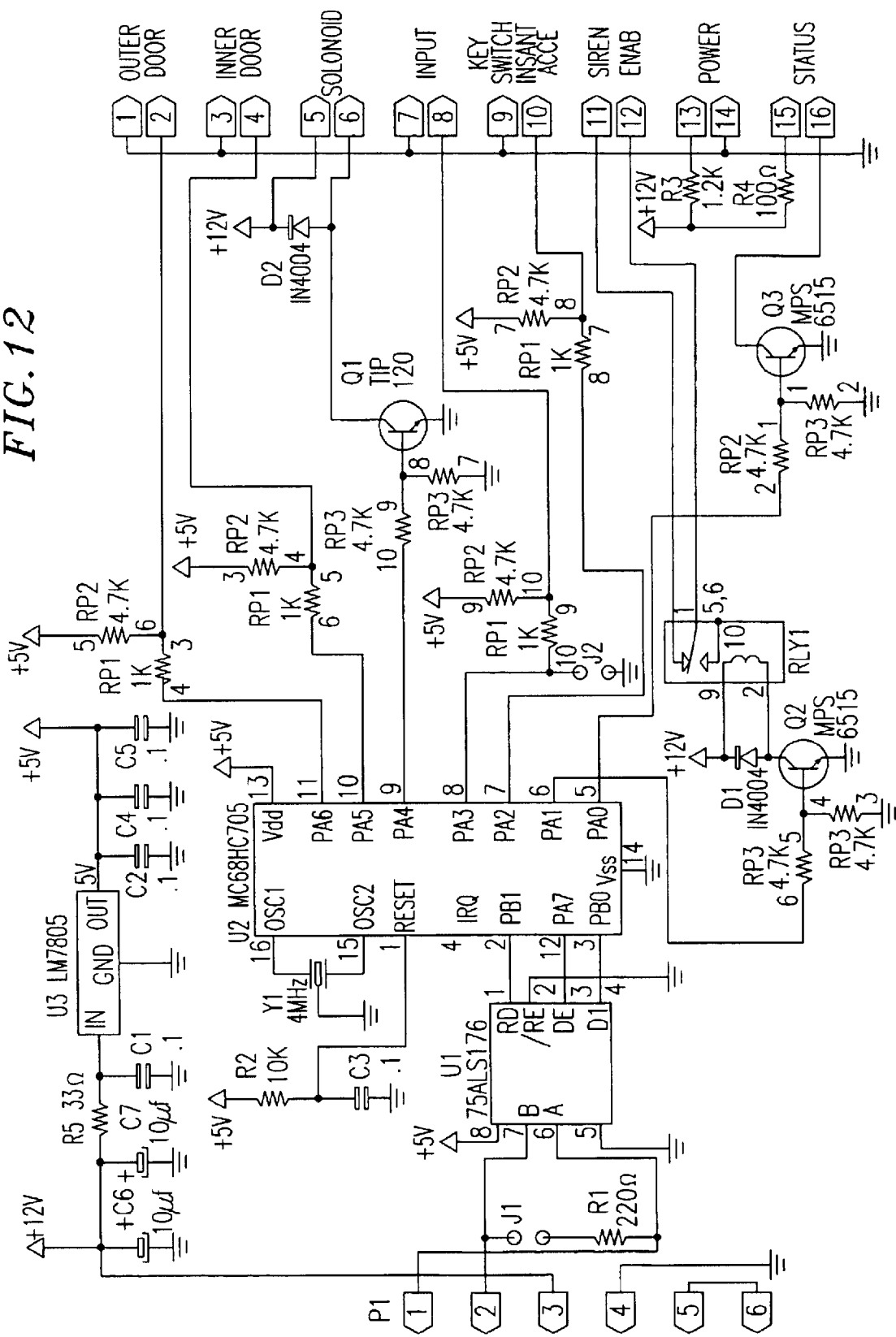
FIG. 12 is a schematic of an illustrative control board for peripheral devices such as bill readers, alarm systems, and door monitoring systems for a rolled coin dispenser unit according to the present invention.
Figure 13:
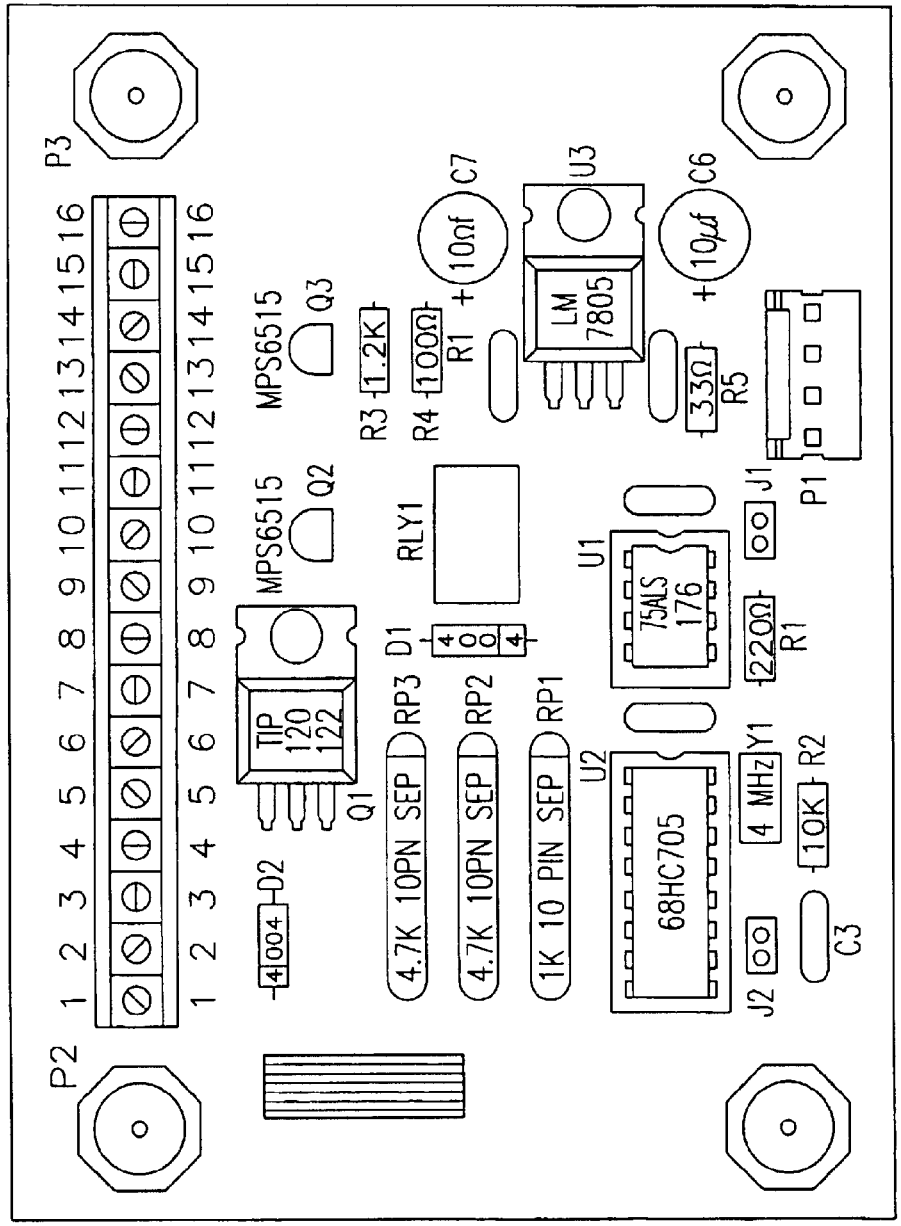
FIG. 13 is a board layout of the control board of FIG. 12.
Figure 14A:
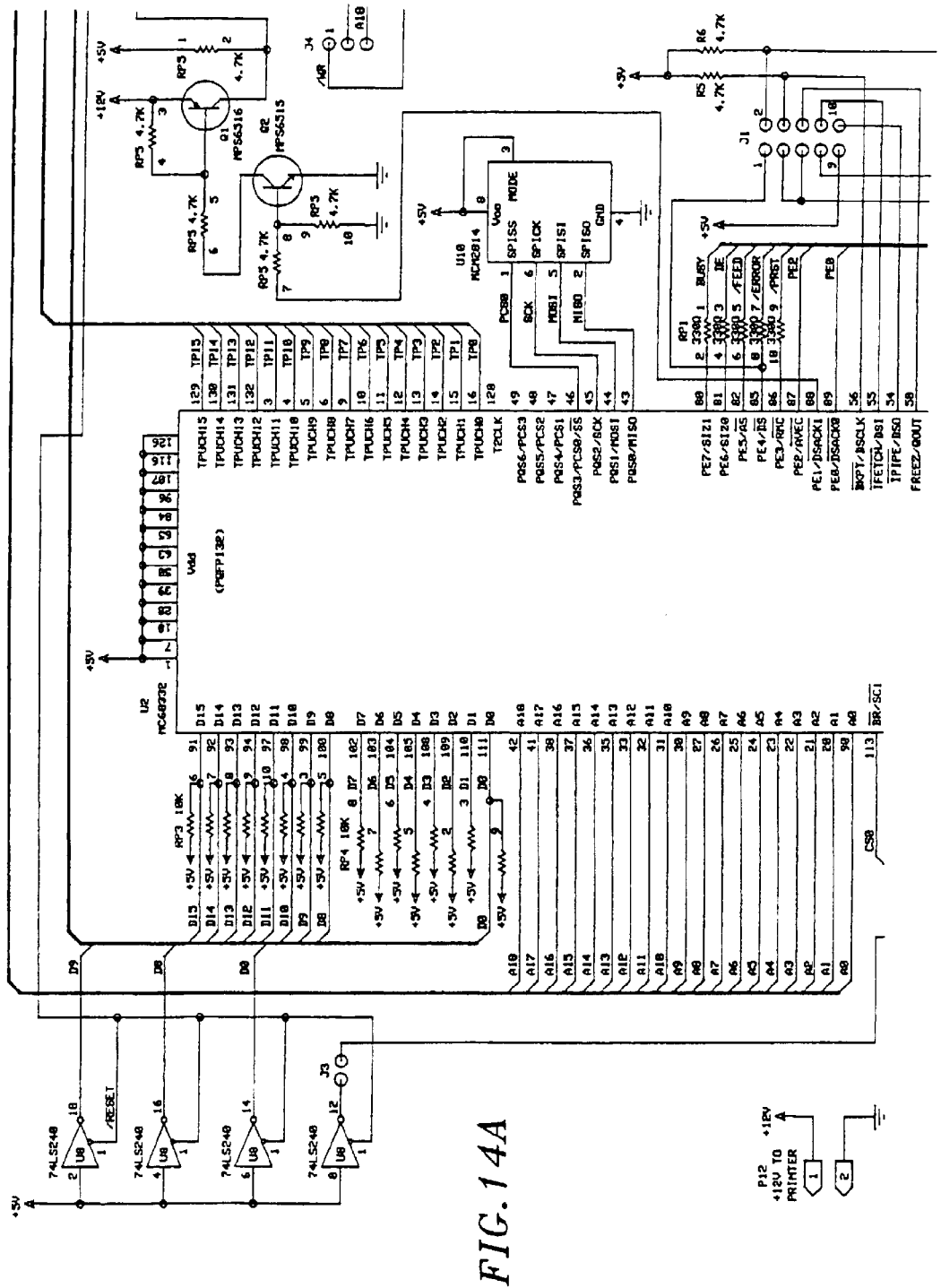
FIGS. 14A–D are quadrants of a schematic of an illustrative controller for a rolled coin dispenser apparatus according to the present invention.
Figure 14B:
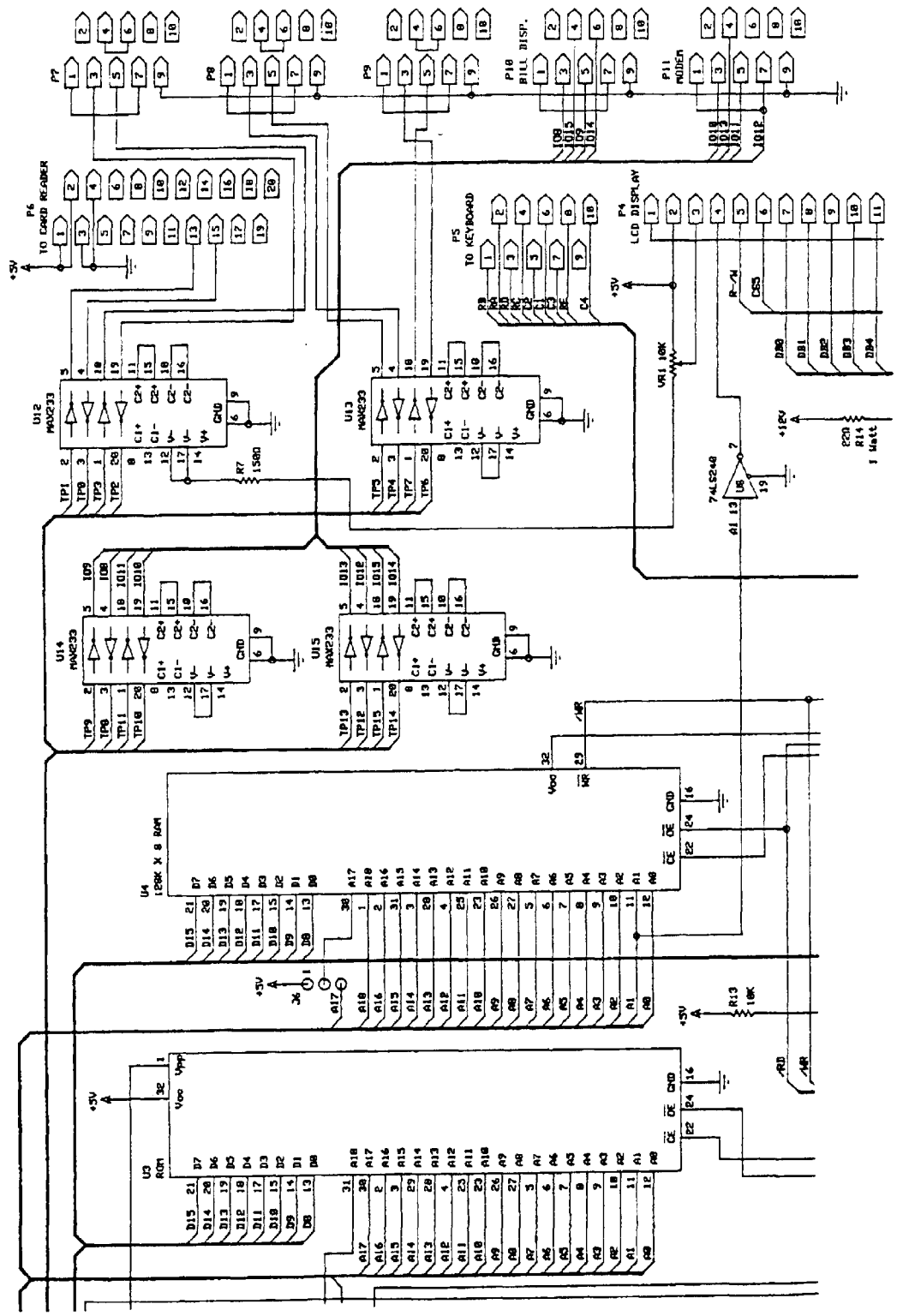
Figure 14C:
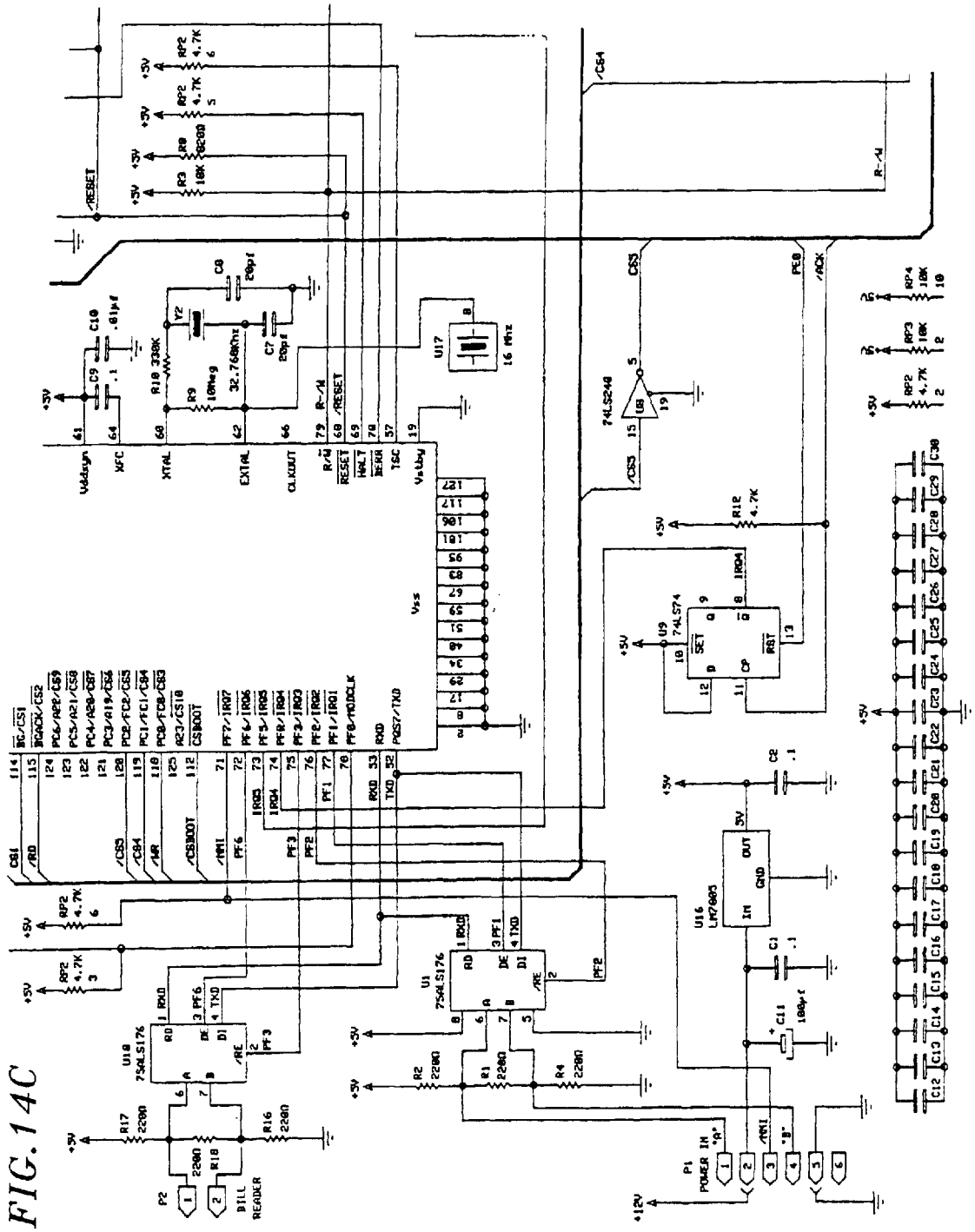
Figure 14D:
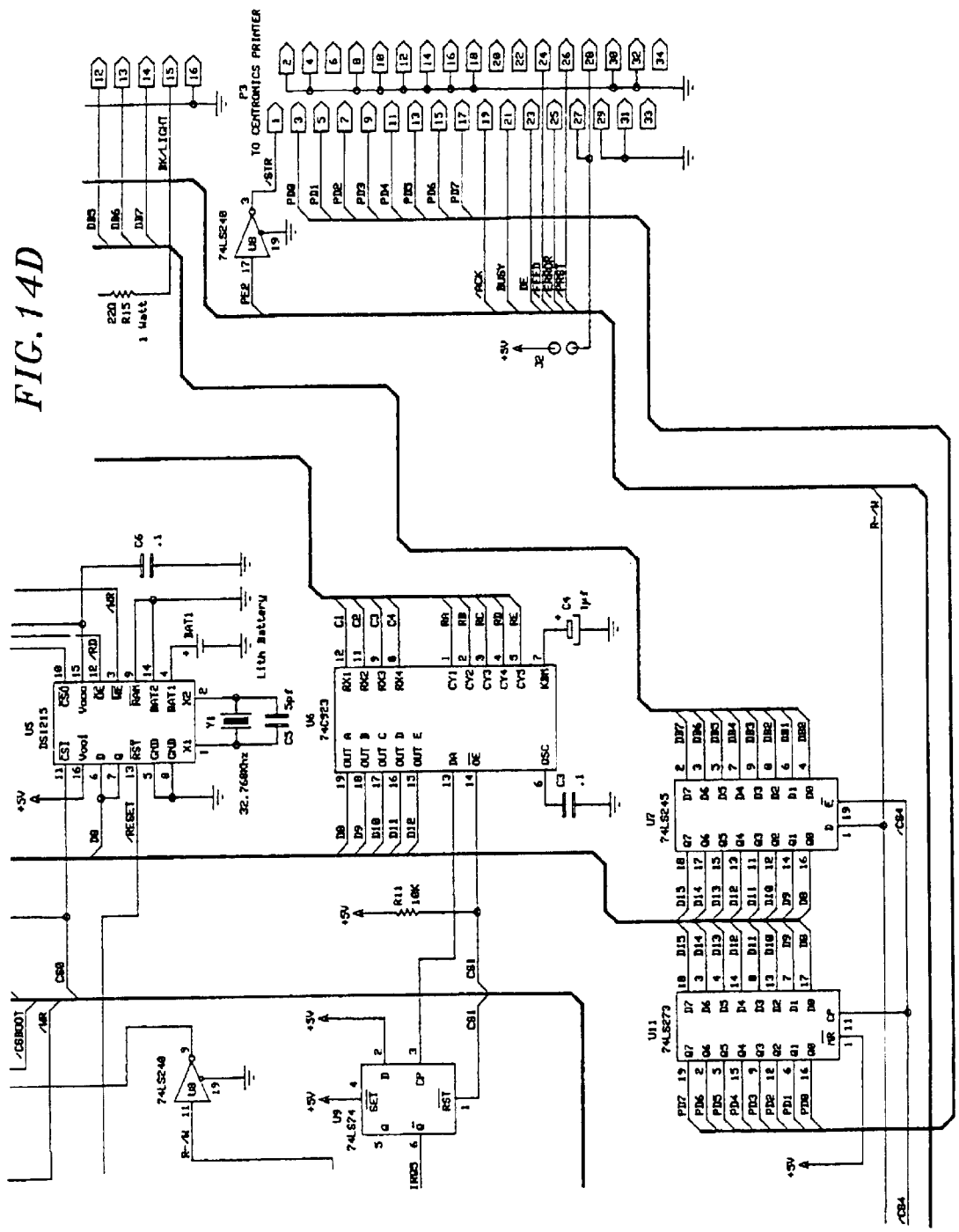

Controller 12 communicates with other peripheral units such as BVS units 18 over another serial communication line. FIGS. 12–13 show a logical schematic and board layout for a control board that interfaces with BVS units 18 and other peripheral devices, such as alarm systems and door monitoring systems (not shown). This allows for integrating with a wide variety of other devices without changing the basic architecture of controller 12. Again, architectures other than a master-slave architecture can be used.

Figure 9A:
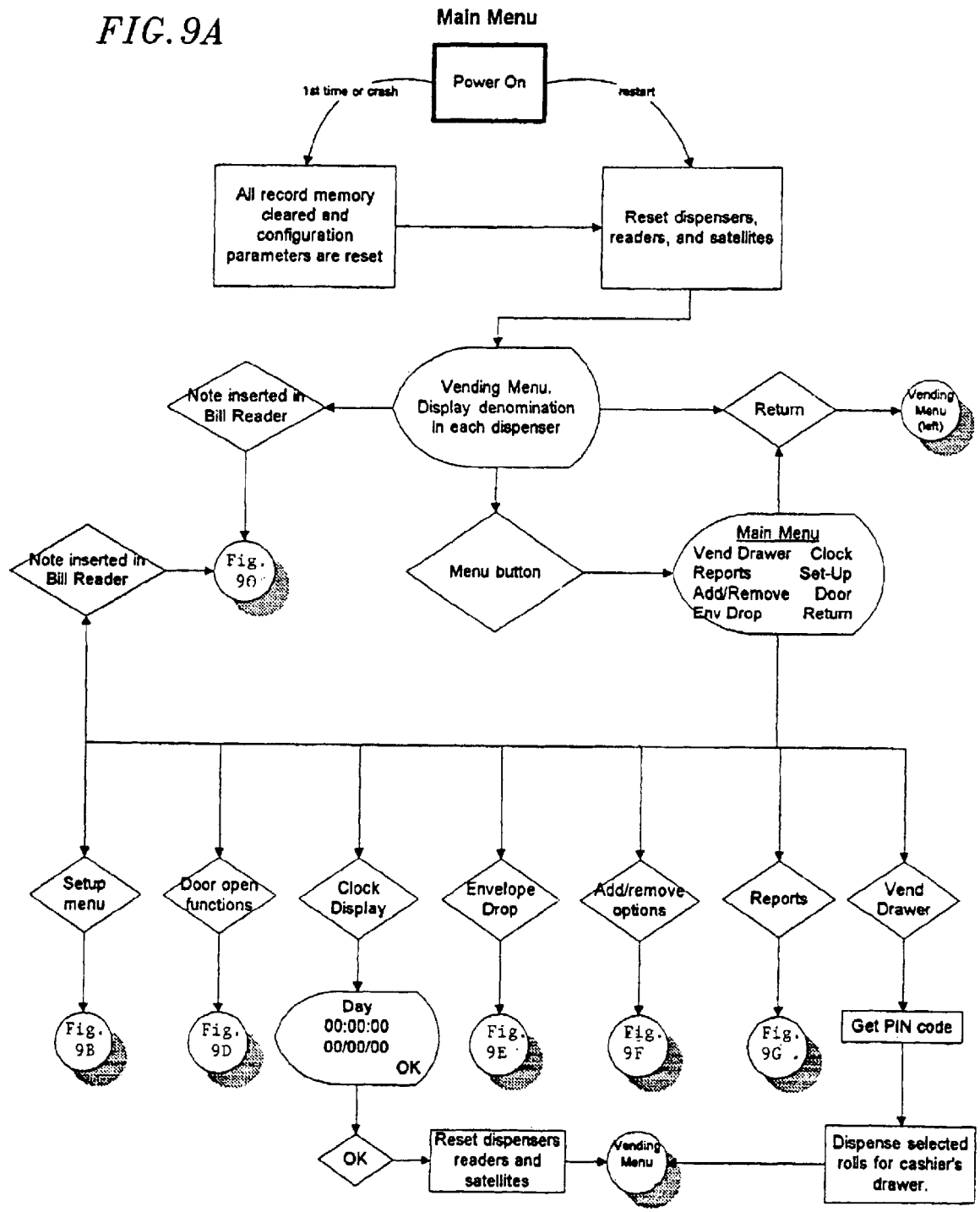
FIGS. 9A–9U are flow diagrams of an illustrative user interface to an intelligent rolled coin dispenser apparatus according to the present invention.
Figure 9B:
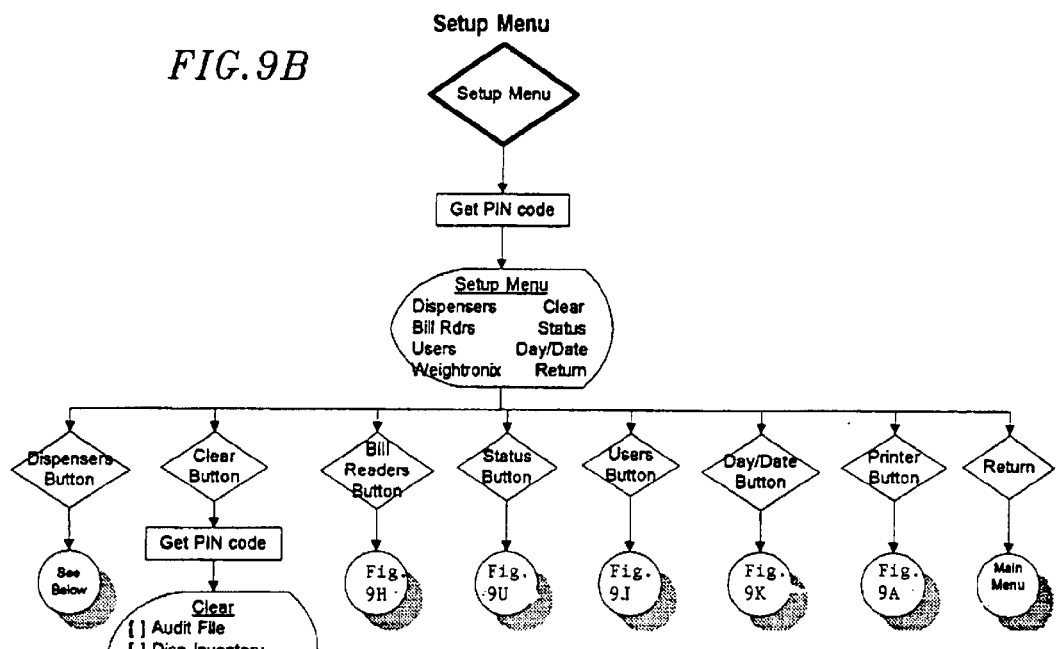
Figure 9C:
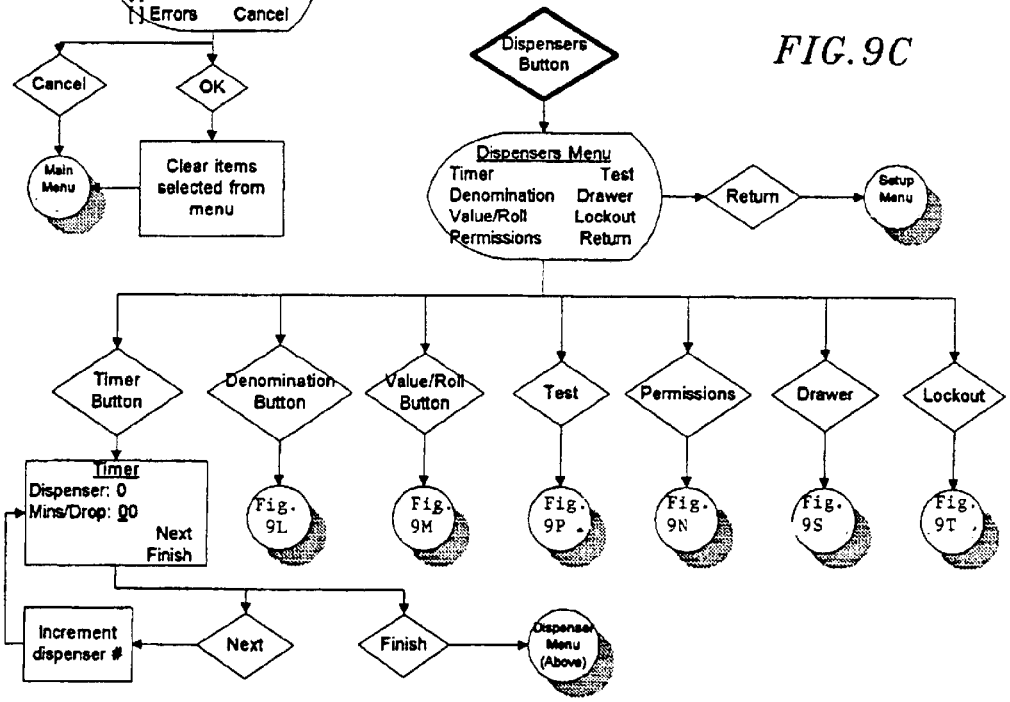
Figure 9D:
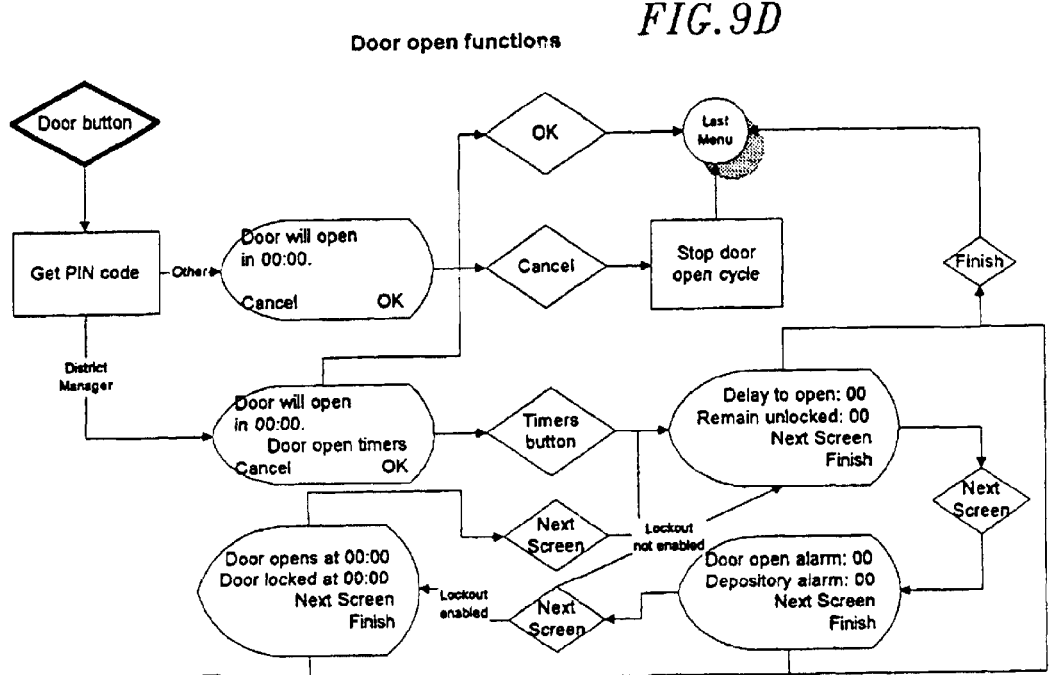
Figure 9E:
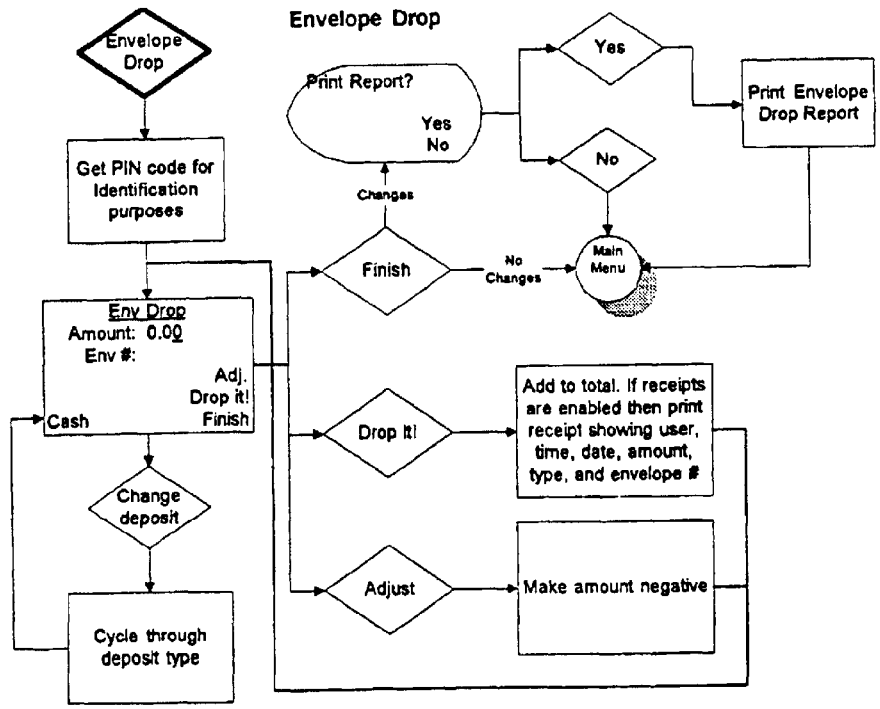
Figure 9G:
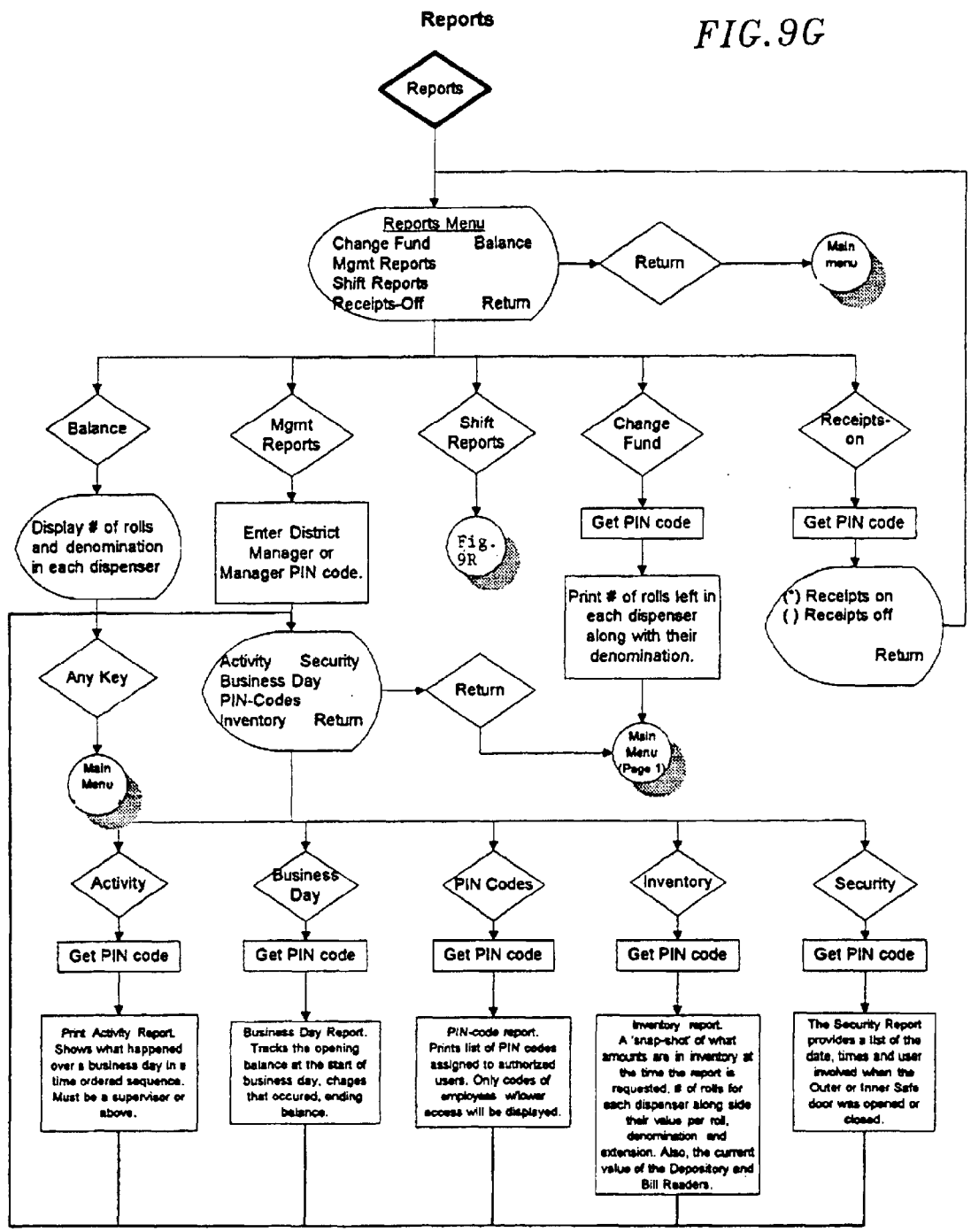
Figure 9H:
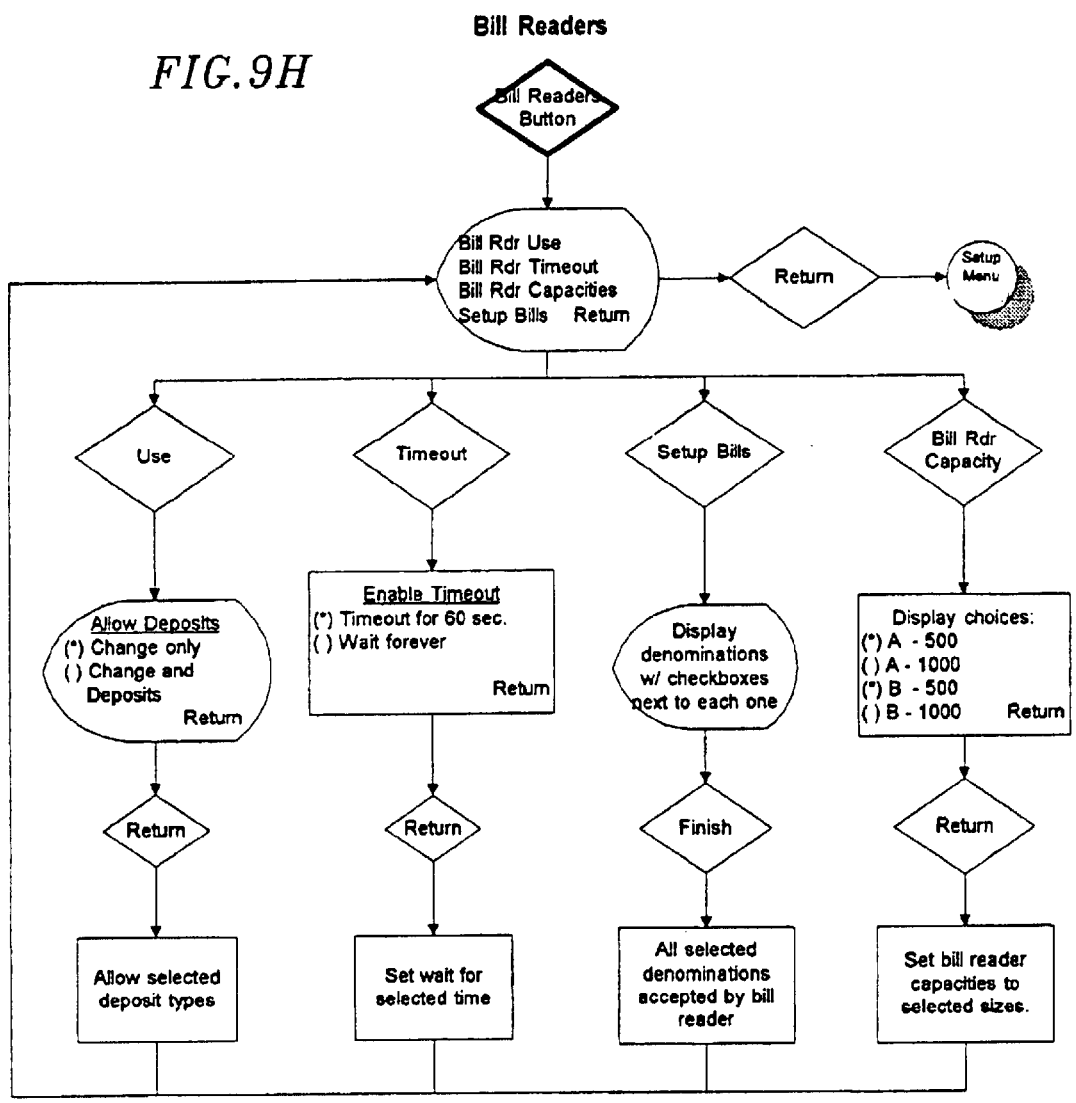
Figure 9I:
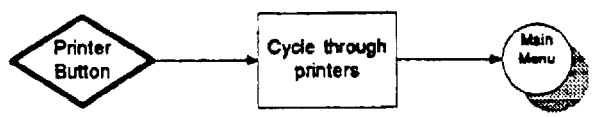
Figure 9J:
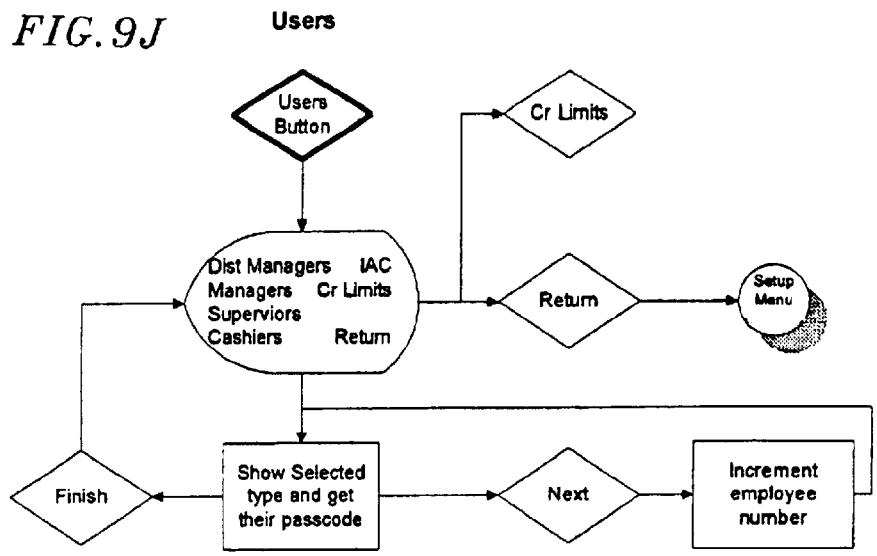
Figure 9K:
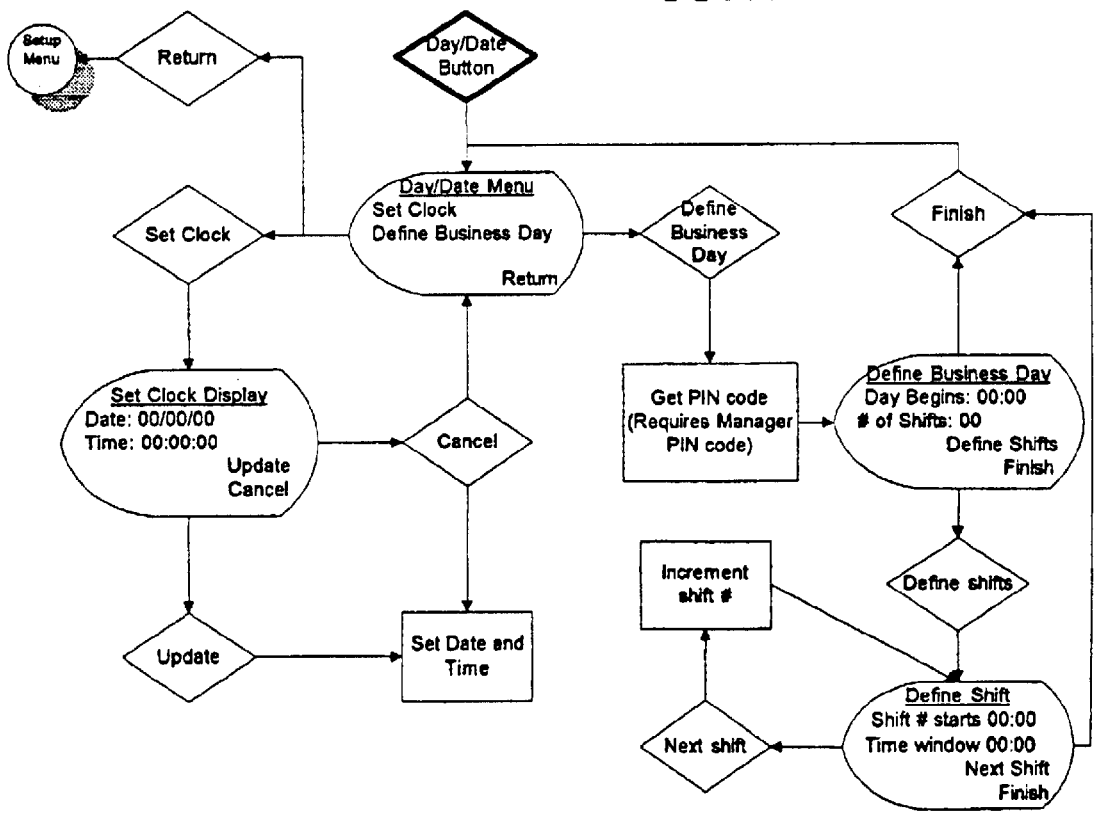
Figure 9O:
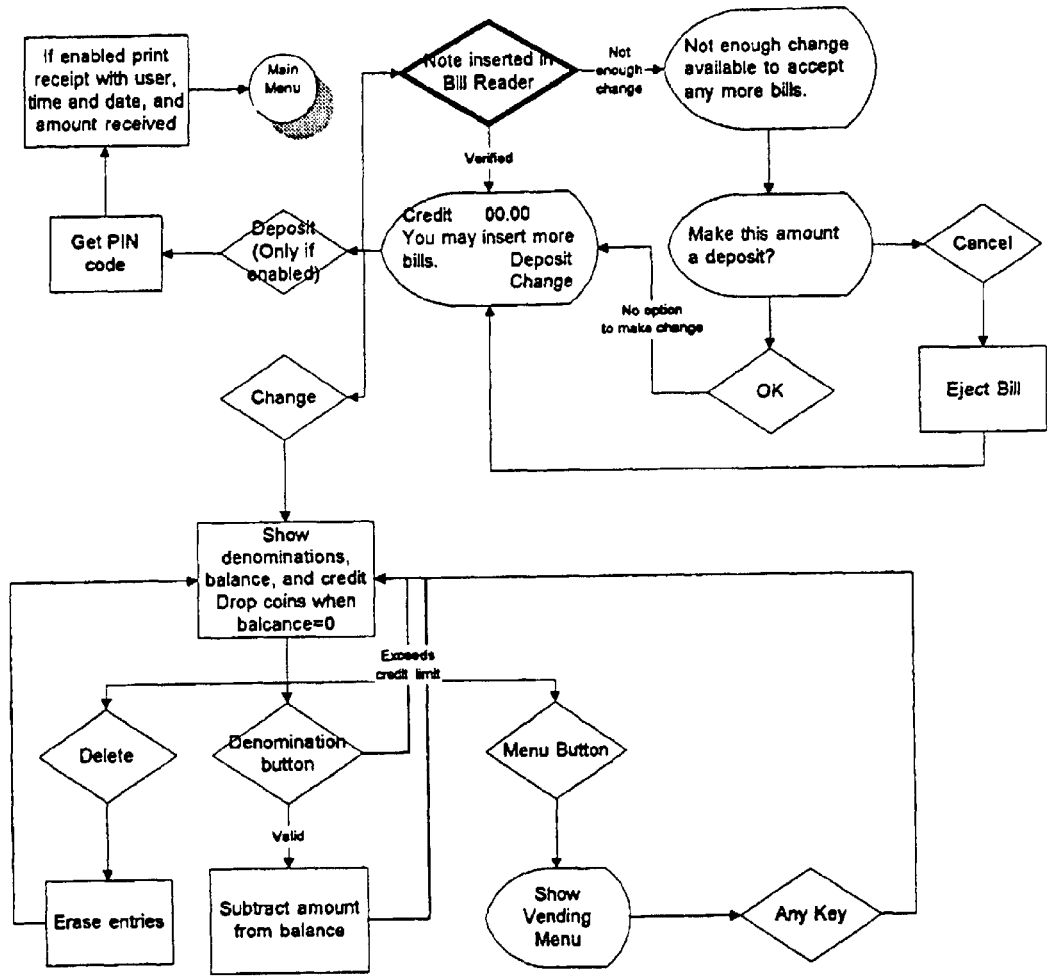
Figure 9P:
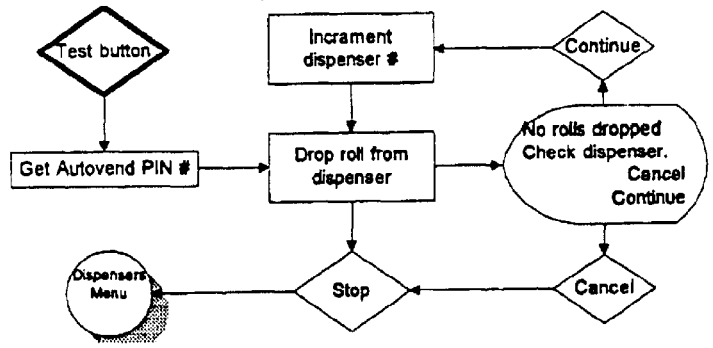
Figure 9Q:
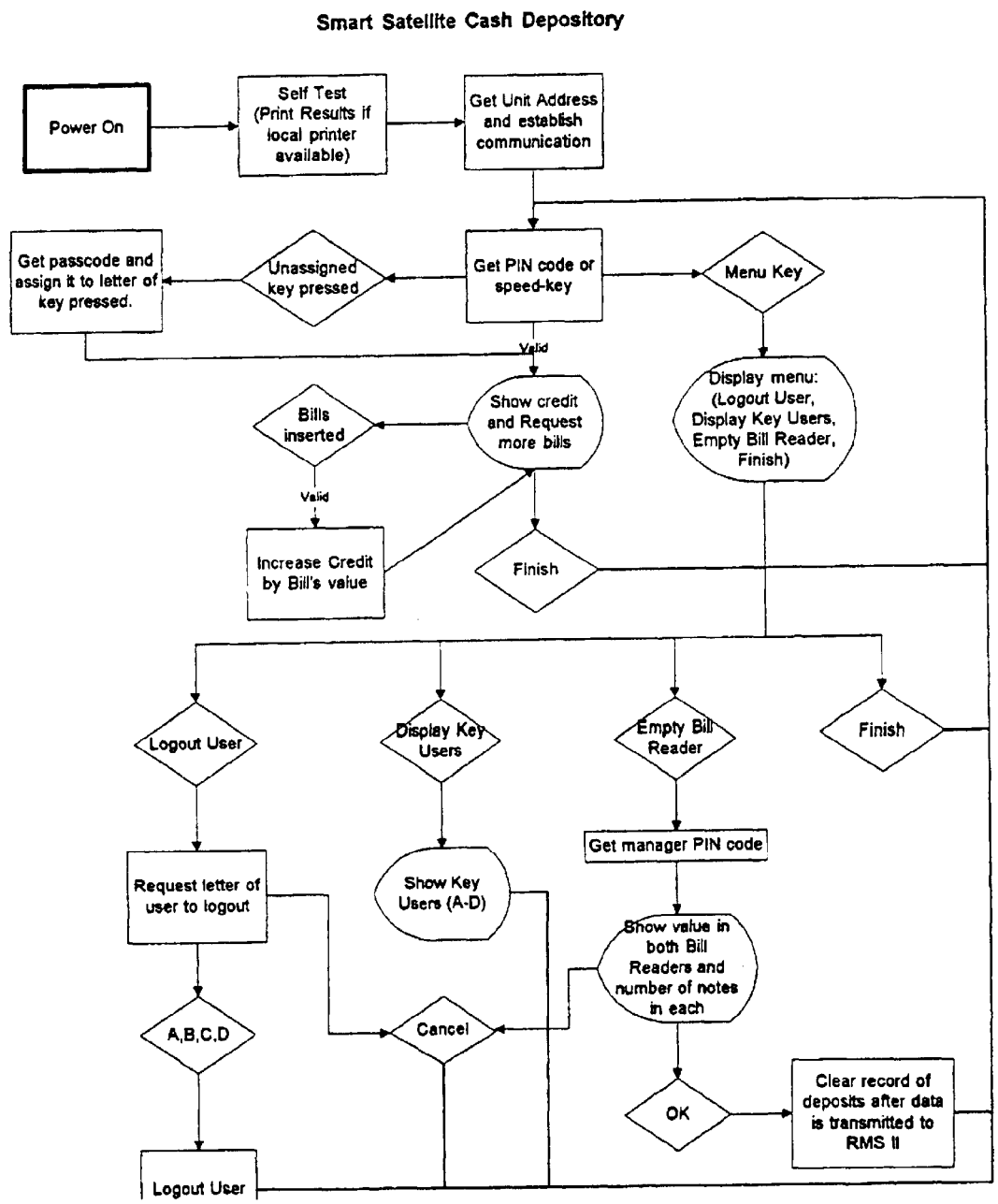
Figure 9R:
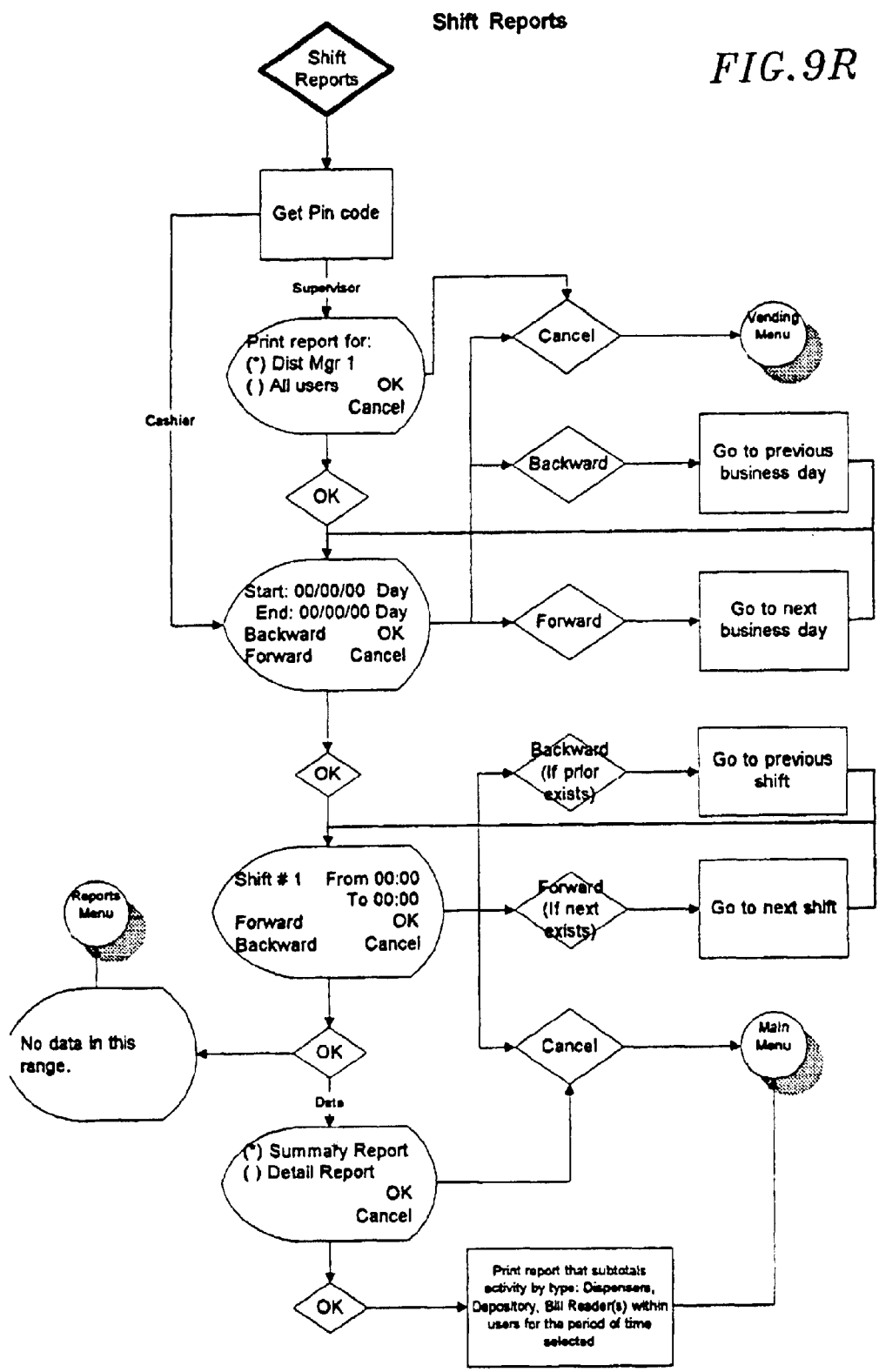
Figure 9U:
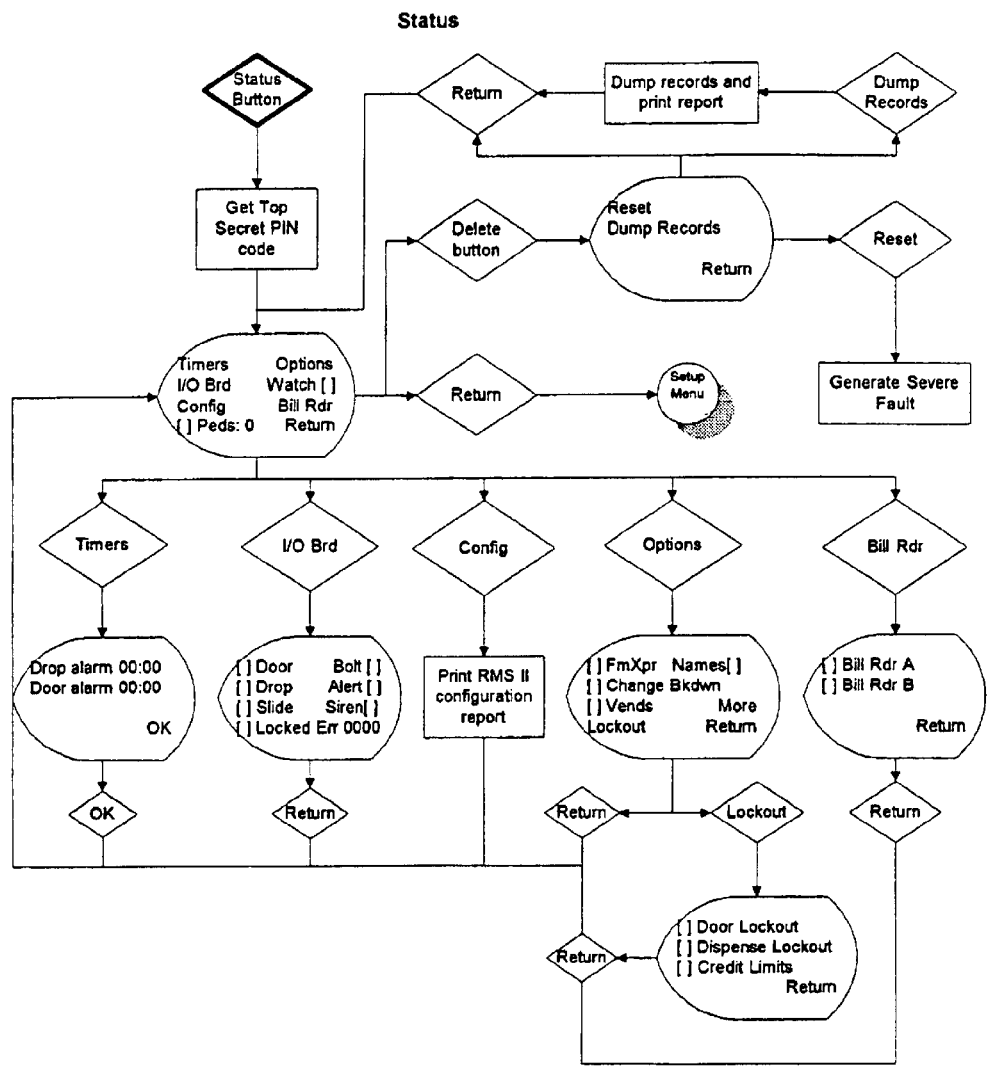

Controller 12 further includes software to integrate the peripheral devices into a coin dispensing system and to provide a user interface via keypad 24, display 26, and printer 28. For example, FIGS. 9A–U show software flow diagrams that illustrate a user interface and control software for use with a rolled coin and currency dispenser that includes eight RCD units 14, one BVS unit 18, keypad 24, display 26, printer 28, and an envelope drop slot for use in a typical retail sales environment such as a convenience store.

Software in controller 12 provides features such as the ability to dispense money to set up a cash drawer automatically in a single operation, the ability to generate audit and accounting reports with access codes correlated to names, security reports, or to interface a personal computer or point of sale device to the system for networked command and control. Providing an interface for a personal computer supports integration of the rolled coin dispensing system into virtually any operating environment, e.g., Windows 95™ or 98™, and allows for advanced user interface techniques, e g., incorporating graphics and sound.

Controller 12 software further provides the ability to select a custom configuration of rolled coin denominations for disbursement in a given transaction. For example, if a user deposits twenty dollars into or uses a debit card or credit card or access code to authorize disbursement of twenty dollars from dispensing apparatus 10, software allows the user to select, for example, dispensation of: two rolls of quarters; four rolls of dimes; one roll of quarters and two rolls of dimes; two rolls of pennies, two rolls of nickels, one roll of dimes, and one roll of quarters; etc. Including a bill dispenser 20 provides further flexibility in providing money to a user.

Controller 12 furthermore includes interlocks and sensors such as motion sensor 33 and heat sensor 31 to control and detect physical entries into coin dispensing apparatus 110. Software monitors all physical entries and records the codes used to enter the system, time and date stamps the information, and stores it in memory for accounting and security purposes. Software allows for unique programming of each rolled coin dispenser 14, such as a time delay between dispenses from each rolled coin dispenser 14 or the ability to override time delays with the appropriate authorization code. Physical entry into the system can also be programmed for a lockout of employee access or access with a time delay, as well as for lockout or delay overrides based on entry of the appropriate authorization code. Security reports are generated based on monitored data.

Although the invention has been described in detail with reference to certain preferred embodiments, variations and modifications exist within the scope and spirit of the present invention as described and defined in the following claims.

What is claimed is:

1. An apparatus for dispensing rolled coins comprising:
   an electronic communication network;
   at least one rolled coin dispenser unit coupled to the network and including a communication module for receiving commands and sending information over the network;
   a controller coupled to the network and configured to send commands to and to receive information from the at least one rolled coin dispenser unit, the controller including software that enables a user to select a first denomination of a first roll of coins to be dispensed and a second denomination of a second roll of coins to be dispensed prior to dispensation, such that an input from the user is not required between dispensation of the first roll of coins and dispensation of the second roll of coins.

2. The apparatus of claim 1, wherein the communication network is a master-slave communication network, the controller is the master communication device, and the at least one rolled coin dispenser unit is a slave communication device.

3. The apparatus of claim 1, further comprising a display and a user input device coupled to one of the controller or the communication network.

4. The apparatus of claim 3, wherein the input device is a touch screen.

5. The apparatus of claim 1, wherein each communication module is capable of communicating with the electronic communication network using one of an RS-485 serial bus, a parallel bus, a peer-to-peer network, an Ethernet, an Echelon LONworks, and a token ring.

6. The apparatus of claim 1, further comprising a card reader coupled to one of the controller or the communication network.

7. The apparatus of claim 1, further comprising a printer coupled to one of the controller or the communication network.

8. The apparatus of claim 1, further comprising a bill reader coupled to one of the controller or the communication network.

9. The apparatus of claim 1, further comprising a bill dispenser coupled to one of the controller or the communication network.

10. The apparatus of claim 1, further comprising a modem coupled to one of the controller or the communication network to send commands and to receive information over the communication network.

11. The apparatus of claim 1, further comprising a security alarm coupled to one of the controller or the communication network.

12. The apparatus of claim 1, wherein the controller includes software that enables a user to deposit cash and to select a dispensation of rolled coins having the same dollar value as the cash.

13. The apparatus of claim 1, wherein each communication module includes a control board.

14. The apparatus of claim 1, wherein the coin dispenser unit includes a sensor that provides a signal indicative of dispensation of a roll of coins to the communication module and the communication module sends information over the communication network indicative of sensor status.

15. The apparatus of claim 14, wherein the sensor is a photo-electric sensor.

16. The apparatus of claim 15, wherein the dispenser is configured to evaluate the sensor signal to determine if any empty container has been dispensed.

17. The apparatus of claim 14, wherein the sensor comprises a drop sensor that detects if a roll of coins has been dispensed, and a reservoir empty sensor.

18. The apparatus of claim 1, further comprising a retina scanning device coupled to one of the controller or the communication network.

19. The apparatus of claim 1, further comprising a fingerprint scanning device coupled to one of the controller or the communication network.

20. The apparatus of claim 1, further comprising a communication device configured to send and to receive information over a cellular telephone network and coupled to one of the controller or the communication network.

21. The apparatus of claim 20, further comprising a security alarm and software configured to transmit security alarm status information over the cellular telephone network.

22. The apparatus of claim 1, wherein one of the controller and the communication network is configured to be coupled to a computer.

23. The apparatus of claim 1, further comprising:
    an uninterruptible power supply;
    a cellular network telemetry device; and
    a sensor configured to detect an alarm condition;
    the controller coupled to the uninterruptible power supply and cellular network telemetry device, and configured to send a message over the cellular network telemetry device automatically when the sensor detects an alarm condition.

24. The apparatus of claim 1, wherein the controller includes software that enables a user to use an access code to select dispensation of rolled coins.

25. The apparatus of claim 1, further comprising a housing containing the electronic communication network and the controller, each rolled coin dispenser unit disposed within the housing and removable therefrom.

26. The apparatus of claim 25, further comprising at least one further housing, each further housing containing a corresponding rolled coin dispenser unit, disposed within the housing and removable therefrom.

27. The apparatus of claim 1, wherein each rolled coin dispenser unit comprises a coin reservoir bounded by a plurality of walls, the communication module included within the plurality of walls.

28. An apparatus for dispensing rolled coins comprising:
    a controller;
    a first dispensing unit to dispense a first denomination of rolled coins;

a second dispensing unit to dispense a second denomination of rolled coins; and each of the first and second dispensing units including a sensor and a communication module as part thereof, and coupled to the controller that is configured to control dispensation from each of the first and second dispensing units, the controller including user interface software to permit a user to select a first denomination of a first roll of coins to be dispensed and a second denomination of a second roll of coins to be dispensed based on a predetermined transaction value, prior to dispensation, such that an input from the user is not required between dispensation of the first roll of coins and dispensation of the second roll of coins.

29. The apparatus of claim 28, wherein each communication module includes a control board.

30. An apparatus for dispensing money comprising:

a controller;

a first dispensing unit to dispense a denomination of paper money;

a second dispensing unit to dispense a denomination of rolled coins; and each of the first and second dispensing units including a sensor and a communication module as part thereof, and coupled to the controller that is configured to control dispensation from each of the first and second dispensing units, the controller including user interface software to permit a user to select a first denomination of first currency to be dispensed and a second denomination of second currency to be dispensed based on a predetermined transaction value, prior to dispensation, such that an input from the user is not required between dispensation of the first currency and dispensation of the second currency.

31. An apparatus for dispensing rolled coins comprising:

an electronic communication network;

a plurality of rolled coin dispenser units coupled to the network, each of the plurality of rolled coin dispenser units including a communication module having logic circuitry programmed with communication protocol of the network for receiving commands and sending information over the network;

a controller coupled to the network and configured to send commands to and to receive information from the plurality of rolled coin dispenser units, the controller including software that enables a user to select dispensation of rolled coins; and a housing containing the electronic communication network and the controller, the plurality of rolled coin dispenser units being disposed within the housing and removable therefrom.

32. The apparatus of claim 31, wherein the network includes a serial bus, a parallel bus or a peer-to-peer network.

33. The apparatus of claim 31, wherein the communication protocol between the controller and the plurality of rolled coin dispenser units is a master/slave protocol.

34. An apparatus for dispensing rolled coins comprising:

an electronic communication network;

at least one rolled coin dispenser unit coupled to the network and including a communication module for receiving commands and sending information over the network;

a controller coupled to the network and configured to send commands to and to receive information from the at least one rolled coin dispenser unit, the controller including software that enables a user to select a first denomination of a first roll of coins to be dispensed and a second denomination of a second roll of coins to be dispensed, wherein if the first roll of coins and the second roll of coins add up to a predetermined monetary value, the first roll of coins and the second roll of coins are dispensed, and wherein if the first roll of coins and the second roll of coins add up to less than the predetermined monetary value, the software enables the user to select a third denomination of a third roll of coins to be dispensed, prior to dispensing the first roll of coins and the second roll of coins.

35. The apparatus of claim 34, wherein the first denomination and the second denomination are identical.

36. The apparatus of claim 34, wherein the first denomination and the second denomination are different from one another.

37. The apparatus of claim 34, wherein the software enables the user to dispense money to set up a cash drawer automatically in a single operation.

* * * * *